(12) United States Patent
Kilibarda

(10) Patent No.: US 11,021,200 B2
(45) Date of Patent: Jun. 1, 2021

(54) MODULAR VEHICLE ASSEMBLY SYSTEM AND METHOD

(71) Applicant: Comau LLC, Southfield, MI (US)

(72) Inventor: Velibor Kilibarda, Southfield, MI (US)

(73) Assignee: Comau LLC, Southfield, MI (US)

( * ) Notice: Subject to any disclaimer, the term of this patent is extended or adjusted under 35 U.S.C. 154(b) by 201 days.

(21) Appl. No.: 16/191,950

(22) Filed: Nov. 15, 2018

(65) Prior Publication Data

US 2019/0118885 A1 Apr. 25, 2019

Related U.S. Application Data

(62) Division of application No. 14/968,126, filed on Dec. 14, 2015, now Pat. No. 10,131,388.

(Continued)

(51) Int. Cl.
*B62D 65/02* (2006.01)
*B23P 21/00* (2006.01)
(Continued)

(52) U.S. Cl.
CPC .......... *B62D 65/022* (2013.01); *B23K 11/115* (2013.01); *B23K 11/3063* (2013.01);
(Continued)

(58) Field of Classification Search
CPC .............. B23K 11/115; B23K 11/3063; B23K 2101/06; B23K 2101/006
See application file for complete search history.

(56) References Cited

U.S. PATENT DOCUMENTS 3,854,889 A 12/1974 Lemelson
4,232,370 A 11/1980 Tapley
(Continued)

FOREIGN PATENT DOCUMENTS

CA 2718907 A1 9/2009
CA 2663307 A1 11/2009
(Continued)

OTHER PUBLICATIONS

FMC; Automated Fork lifts and Material Handling Lifts—Forked Automated Guided Vehicles; http://www.fmcsgvs.com/content/products/forked.sub.—vehicles.htm;p. 1.
(Continued)

*Primary Examiner* — Jason L Vaughan
*Assistant Examiner* — Amanda Kreiling
(74) *Attorney, Agent, or Firm* — Young Basile Hanlon & MacFarlane, P.C.

(57) ABSTRACT

A modular vehicle assembly system and methods for increased flexibility and adaptability of a high-volume assembly facility which builds several vehicle models. In one example, the invention includes modular assembly equipment (AE) support pallets which are shipped to vendors for installation of selected AE equipment devices that are specific to a predetermined assembly operation and then validation tested prior to shipment to the assembly facility. The validated modular AE pallets and AE devices are then shipped to the assembly facility and quickly installed to support manufacturing, assembly or other operations.

18 Claims, 16 Drawing Sheets

Related U.S. Application Data

(60) Provisional application No. 62/091,687, filed on Dec. 15, 2014.

(51) Int. Cl.
*B23K 37/047* (2006.01)
*B23K 11/11* (2006.01)
*B23K 11/30* (2006.01)
B23K 101/00 (2006.01)
B23K 101/06 (2006.01)

(52) U.S. Cl.
CPC .......... *B23K 37/047* (2013.01); *B23P 21/004* (2013.01); *B62D 65/02* (2013.01); *B23K 2101/006* (2018.08); *B23K 2101/06* (2018.08); *B23P 2700/50* (2013.01)

(56) References Cited

U.S. PATENT DOCUMENTS

| | | |
|---|---|---|
| 4,328,422 A | 5/1982 | Loomer |
| 4,369,563 A | 1/1983 | Williamson |
| 4,442,335 A | 4/1984 | Rossi |
| 4,530,056 A | 7/1985 | MacKinnon et al. |
| 4,600,136 A | 7/1986 | Sciaky et al. |
| 4,659,895 A | 4/1987 | Di Rosa |
| 4,667,866 A | 5/1987 | Tobita et al. |
| 4,673,076 A | 6/1987 | Mattson |
| 4,679,297 A | 7/1987 | Hansen, Jr. et al. |
| 4,734,979 A | 4/1988 | Sakamoto et al. |
| 4,736,515 A | 4/1988 | Catena |
| 4,738,387 A | 4/1988 | Jaufmann et al. |
| 4,774,757 A | 10/1988 | Sakamoto et al. |
| 4,779,787 A | 10/1988 | Naruse et al. |
| 4,795,075 A | 1/1989 | Pigott et al. |
| 4,800,249 A | 1/1989 | Di Rosa |
| 4,815,190 A | 3/1989 | Haba, Jr. et al. |
| 4,872,419 A | 10/1989 | Blankemeyer et al. |
| 4,928,383 A | 5/1990 | Kaozmarek et al. |
| 5,011,068 A | 4/1991 | Stoutenburg et al. |
| 5,123,148 A | 6/1992 | Ikeda et al. |
| 5,152,050 A | 10/1992 | Kaozmarek et al. |
| 5,285,604 A | 2/1994 | Carlin |
| 5,301,411 A | 4/1994 | Fujiwara et al. |
| 5,319,840 A | 6/1994 | Yamamoto et al. |
| 5,347,700 A | 9/1994 | Tominaga et al. |
| 5,397,047 A | 3/1995 | Zampini |
| 5,427,300 A | 6/1995 | Quagline |
| 5,560,535 A | 10/1996 | Miller et al. |
| 5,577,595 A | 11/1996 | Pollock et al. |
| 5,853,215 A | 12/1998 | Lowery |
| 5,864,991 A | 2/1999 | Burns |
| 5,882,174 A | 3/1999 | Woerner et al. |
| 5,902,496 A | 5/1999 | Alborante |
| 5,940,961 A | 8/1999 | Parete |
| 5,943,768 A | 8/1999 | Ray |
| 6,059,169 A | 5/2000 | Nihei et al. |
| 6,065,200 A | 5/2000 | Negre |
| 6,098,268 A | 8/2000 | Negre et al. |
| 6,132,509 A | 10/2000 | Kuschnereit |
| 6,138,889 A | 10/2000 | Campani et al. |
| 6,170,732 B1 | 1/2001 | Vogt et al. |
| 6,193,142 B1 | 2/2001 | Segawa et al. |
| 6,250,533 B1 | 6/2001 | Otterbein et al. |
| 6,253,504 B1 | 7/2001 | Cohen et al. |
| 6,324,880 B1 | 12/2001 | Nakamura |
| 6,325,435 B1 | 12/2001 | Dubuc |
| 6,336,582 B1 | 1/2002 | Kato et al. |
| 6,349,237 B1 | 2/2002 | Koren et al. |
| 6,457,231 B1 | 10/2002 | Carter et al. |
| 6,467,675 B1 | 10/2002 | Ozaku et al. |
| 6,513,231 B1 | 2/2003 | Hafenrichter et al. |
| 6,516,234 B2 | 2/2003 | Kamiguchi et al. |
| 6,564,440 B2 | 5/2003 | Oldford et al. |
| 6,651,392 B2 | 11/2003 | Ritzal |
| 6,688,048 B2 | 2/2004 | Staschik |
| 6,705,001 B2 | 3/2004 | How et al. |
| 6,705,523 B1 | 3/2004 | Stamm et al. |
| 6,719,122 B2 | 4/2004 | Oldford et al. |
| 6,744,436 B1 | 6/2004 | Chirieleison, Jr. et al. |
| 6,799,672 B2 | 10/2004 | Wood |
| 6,799,673 B2 | 10/2004 | Kilabarda |
| 6,813,539 B2 | 11/2004 | Morimoto et al. |
| 6,916,375 B2 | 7/2005 | Molnar et al. |
| 6,948,227 B2 | 9/2005 | Kilibarda et al. |
| 6,966,427 B2 | 11/2005 | Kilibarda |
| 6,990,715 B2 | 1/2006 | Liu et al. |
| 7,108,189 B2 | 9/2006 | Kilibarda |
| 7,331,439 B2 | 2/2008 | Degain et al. |
| 7,356,378 B1 | 4/2008 | Huang et al. |
| 7,490,710 B1 | 2/2009 | Weskamp et al. |
| 7,546,942 B2 | 6/2009 | Monti et al. |
| 7,845,121 B2 | 12/2010 | Wobben |
| 8,097,451 B2 | 1/2012 | Gaalswyk |
| 8,127,687 B2 | 3/2012 | Spangler et al. |
| 8,201,723 B2 | 6/2012 | Kilibarda |
| 8,308,048 B2 | 11/2012 | Kilibarda |
| 8,360,225 B2 | 1/2013 | Spangler et al. |
| 8,474,132 B2 | 7/2013 | Li et al. |
| 8,474,683 B2 | 7/2013 | Kilibarda |
| 8,713,780 B2 | 5/2014 | Kilibarda |
| 8,733,617 B2 | 5/2014 | Kilibarda |
| 8,789,269 B2 | 7/2014 | Kilibarda et al. |
| 8,869,370 B2 | 10/2014 | Kilibarda |
| 2002/0087226 A1 | 7/2002 | Boudreau |
| 2002/0103569 A1 | 8/2002 | Mazur |
| 2002/0129566 A1 | 9/2002 | Piccolo et al. |
| 2002/0135116 A1 | 9/2002 | Dugas et al. |
| 2002/0162209 A1 | 11/2002 | Hosono et al. |
| 2003/0037432 A1 | 2/2003 | McNamara |
| 2003/0057256 A1 | 3/2003 | Nakamura et al. |
| 2003/0115746 A1 | 6/2003 | Saito et al. |
| 2003/0175429 A1 | 9/2003 | Molnar et al. |
| 2003/0188952 A1 | 10/2003 | Oldford et al. |
| 2003/0189085 A1 | 10/2003 | Kilibarda et al. |
| 2004/0002788 A1 | 1/2004 | Morimoto et al. |
| 2004/0020974 A1 | 2/2004 | Becker et al. |
| 2004/0055129 A1 | 3/2004 | Ghuman |
| 2004/0216983 A1 | 11/2004 | Oldford et al. |
| 2004/0221438 A1 | 11/2004 | Savoy et al. |
| 2005/0008469 A1 | 1/2005 | Jung |
| 2005/0025612 A1 | 2/2005 | Ehrenleitner |
| 2005/0035175 A1 | 2/2005 | Nakamura et al. |
| 2005/0044700 A1 | 3/2005 | Ghuman et al. |
| 2005/0120536 A1 | 6/2005 | Kilibarda et al. |
| 2005/0153075 A1 | 7/2005 | Molnar et al. |
| 2005/0189399 A1 | 9/2005 | Kilibarda |
| 2005/0230374 A1 | 10/2005 | Rapp et al. |
| 2005/0236461 A1 | 10/2005 | Kilibarda et al. |
| 2005/0269382 A1 | 12/2005 | Caputo et al. |
| 2006/0157533 A1 | 7/2006 | Onoue et al. |
| 2006/0231371 A1 | 10/2006 | Moliere et al. |
| 2006/0288577 A1 | 12/2006 | Bormuth |
| 2007/0164009 A1 | 7/2007 | Hesse |
| 2008/0022609 A1 | 1/2008 | Franco et al. |
| 2008/0061110 A1 | 3/2008 | Monti et al. |
| 2008/0084013 A1 | 4/2008 | Kilibarda |
| 2008/0104815 A1 | 5/2008 | Kussmaul |
| 2008/0105733 A1 | 5/2008 | Monti et al. |
| 2008/0116247 A1 | 5/2008 | Kilibarda |
| 2008/0131255 A1 | 6/2008 | Hessler et al. |
| 2008/0148546 A1 | 6/2008 | Monti et al. |
| 2008/0178537 A1 | 7/2008 | Spangler et al. |
| 2008/0181753 A1 | 7/2008 | Bastian et al. |
| 2008/0223692 A1 | 9/2008 | Tanahashi |
| 2008/0295335 A1 | 12/2008 | Kilibarda et al. |
| 2009/0056116 A1 | 3/2009 | Presley et al. |
| 2009/0078741 A1 | 3/2009 | Sata et al. |
| 2009/0118858 A1 | 5/2009 | Wallace et al. |
| 2009/0191032 A1 | 7/2009 | Bogaczyk |
| 2009/0234488 A1* | 9/2009 | Kilibarda ............... B62D 65/02 700/117 |
| 2009/0277747 A1 | 11/2009 | Spangler et al. |
| 2009/0277748 A1 | 11/2009 | Spangler et al. |

(56) References Cited

U.S. PATENT DOCUMENTS

| | | |
|---|---|---|
| 2009/0277754 A1 | 11/2009 | Spangler et al. |
| 2009/0277755 A1 | 11/2009 | Spangler et al. |
| 2009/0279992 A1 | 11/2009 | Spangler et al. |
| 2009/0285666 A1 | 11/2009 | Kilibarda |
| 2009/0300998 A1 | 12/2009 | Ablett |
| 2010/0241260 A1 | 9/2010 | Kilibarda et al. |
| 2010/0290870 A1 | 11/2010 | Ezure et al. |
| 2010/0301099 A1 | 12/2010 | Sata et al. |
| 2011/0047788 A1 | 3/2011 | Immekus et al. |
| 2011/0047791 A1 | 3/2011 | Ferenczi et al. |
| 2011/0138601 A1 | 6/2011 | Kilibarda |
| 2011/0192007 A1 | 8/2011 | Kilibarda |
| 2011/0252719 A1 | 10/2011 | Wallance |
| 2012/0005968 A1 | 1/2012 | Patino |
| 2012/0222277 A1 | 9/2012 | Spangler et al. |
| 2012/0274000 A1 | 11/2012 | Gaiser |
| 2012/0304446 A1 | 12/2012 | Kilibarda |
| 2013/0026002 A1 | 1/2013 | Spangler |
| 2013/0109291 A1 | 5/2013 | Holtz et al. |
| 2014/0217155 A1 | 8/2014 | Kilibarda |

FOREIGN PATENT DOCUMENTS

| | | |
|---|---|---|
| CA | 2659143 A1 | 4/2010 |
| CA | 2904751 A1 | 4/2010 |
| CA | 2904752 A1 | 4/2010 |
| CA | 2786113 A1 | 7/2011 |
| CN | 101579792 A | 11/2009 |
| CN | 101722421 A | 6/2010 |
| CN | 103649857 A | 3/2014 |
| DE | 19806963 A1 | 10/1998 |
| DE | 19736252 A1 | 3/1999 |
| DE | 20012052 U1 | 10/2000 |
| DE | 19940992 A1 | 3/2001 |
| DE | 102004057664 A1 | 6/2006 |
| DE | 102005062691 A1 | 7/2007 |
| EP | 201262 A1 | 11/1986 |
| EP | 0232999 A2 | 8/1987 |
| EP | 0261297 A1 | 3/1988 |
| EP | 0446518 A1 | 9/1991 |
| EP | 0673711 A1 | 9/1995 |
| EP | 0865869 A1 | 9/1998 |
| EP | 1298043 A2 | 4/2003 |
| EP | 1310324 A1 | 5/2003 |
| EP | 1362663 A2 | 11/2003 |
| EP | 1403176 A2 | 3/2004 |
| EP | 1426275 A1 | 6/2004 |
| EP | 2082831 A1 | 7/2009 |
| EP | 2100804 A1 | 9/2009 |
| EP | 2119532 A1 | 11/2009 |
| EP | 2332689 A1 | 6/2011 |
| EP | 2505299 A1 | 10/2012 |
| EP | 2585656 A2 | 5/2013 |
| EP | 2715465 A1 | 4/2014 |
| GB | 2250723 A | 6/1992 |
| GB | 2271651 A | 4/1994 |
| JP | 10101222 | 4/1998 |
| WO | 8603153 A1 | 6/1986 |
| WO | 0068117 A1 | 11/2000 |
| WO | 2006109246 A1 | 10/2006 |
| WO | 2007077056 A1 | 7/2007 |
| WO | 2011085175 A2 | 7/2011 |
| WO | 2011162930 A1 | 12/2011 |
| WO | 2012166775 A1 | 12/2012 |
| WO | 2016100220 A1 | 6/2016 |

OTHER PUBLICATIONS

FMC; SGV (Self Guided Vehicles)—Automated Guided Vehicle Systems; http://www.fmcsgvs.com/content/products/sgv.htm, p. 1.

FMC; Automated Material Handling Systems & Equipment for Material Movement: AGV Applications; http://www.fmcsgvs.com/content/sales/applications.htm; pp. 1-2.

FMC; Layout Wizard AGV Configuration Software; http://fmcsgvs.com/content/products/wizard.htm; p. 1.

FMC; Laser Navigation Controls; http://www.fmcsgvs.com/content/products/nav.htm; pp. 1-2.

European Search Report dated Jul. 13, 2009 from the corresponding European Application No. 09151980.1-1523.

FMC; AGV System Controls; http://www.fmcsgvs.com/content/products/system.htm; p. 1.

European Search Report dated Apr. 19, 2011 from the corresponding European Patent Application No. 11152656.2-2302.

European Search Report dated Aug. 28, 2009 from the corresponding European Patent Application No. 09158794.9-2302.

Mats Jackson and Abedullah Zaman, Factory-In-a-Box-Mobile Production Capacity of Demand, International Journal of Modern Engineering vol. 8, No. 1 Fall2007.

Notification of Transmittal, the International Search Report and the Written Opinion of the International Searching Authority dated Jan. 28, 2013, from the corresponding International Application No. PCT/US2011/020486 filed Jan. 7, 2011.

International Search Report and Written Opinion of the International Searching Authority dated Oct. 9, 2012 from the corresponding International Application No. PCT/US2012/039952.

International Search Report and Written Opinion of the International Searching Authority dated Aug. 29, 2011 from the corresponding International Application No. PCT/US2011/039097.

International Search Report in related matter PCT/US2015/065588, dated May 19, 2016, 25 pages.

\* cited by examiner

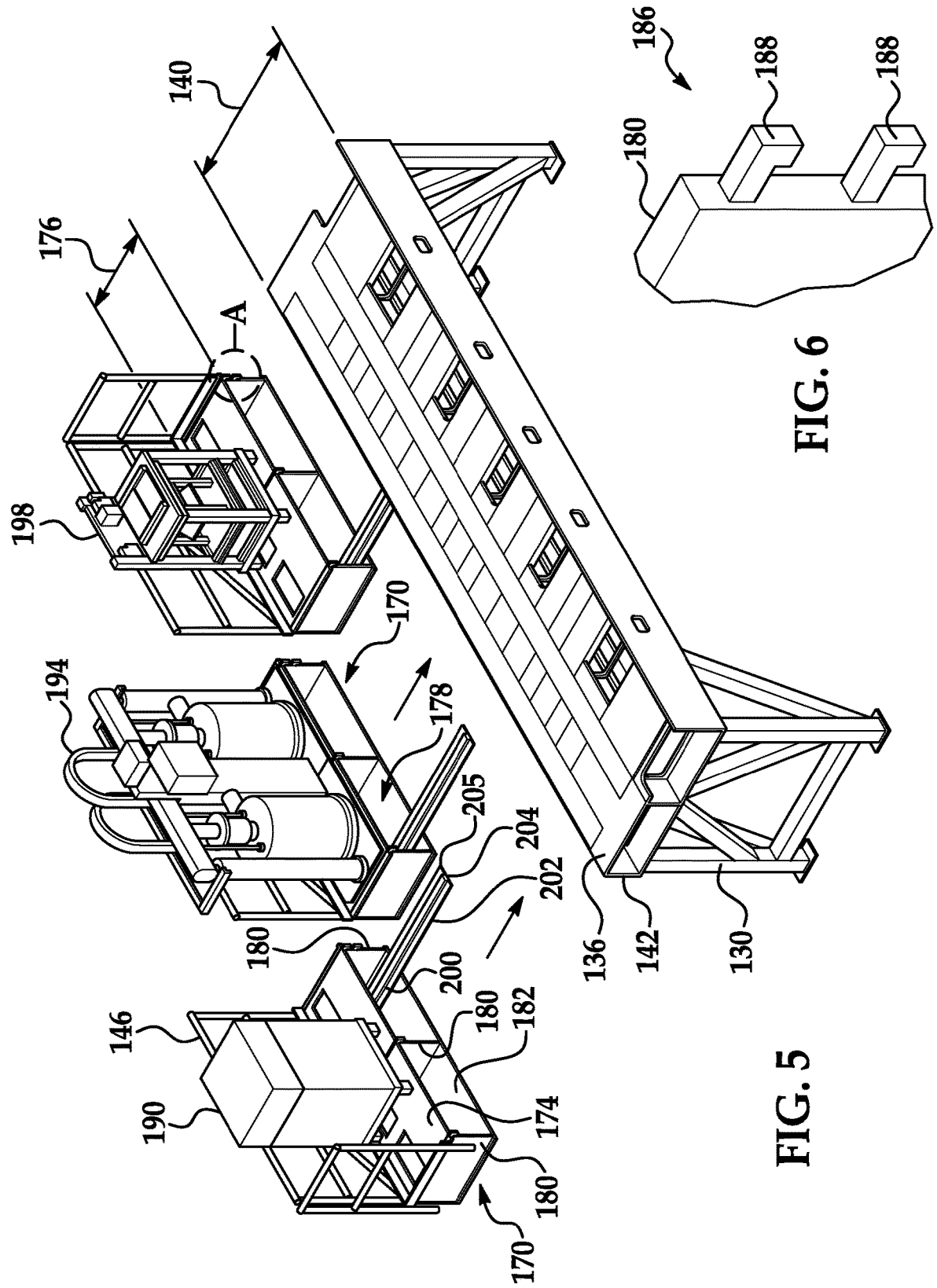

MODULAR VEHICLE ASSEMBLY SYSTEM AND METHOD

CROSS-REFERENCE TO RELATED APPLICATIONS

This divisional application claims priority benefit to U.S. Utility patent application Ser. No. 14/968,126 filed Dec. 14, 2015 which claims priority benefit to U.S. Provisional Patent Application No. 62/091,687 filed Dec. 15, 2014 the entire contents of both applications are incorporated herein by reference.

TECHNICAL FIELD

The invention generally pertains to the field of product and vehicle assembly.

BACKGROUND

Traditional high volume manufacture and assembly of products, machines and vehicles has occurred in large assembly plants. These assembly plants have included multiple assembly lines where components are gathered, assembled and connected together. In the manufacture and assembly of vehicular bodies, the bodies typically include a skeleton of sheet metal components that are welded together through resistance spot welding, seam welding and brazing techniques to form what are commonly called "body-in-white" (BIW) structures.

With the growing need to efficiently build vehicles and accommodate varying consumer demand, assembly plants have strived to employ flexible build processes so that different vehicles and varying vehicle models including alternate vehicle bodies, can be built along the same assembly lines. The ability to quickly change over from building one type of body to another causes significant difficulty for facilities due to the limited amount of space around assembly lines and the time required to change over equipment and components that are specific to one vehicle body.

The design, build, installation and commission (testing or prove-out) of new assembly lines is an enormously time consuming and expensive endeavor for both suppliers and the customer vehicle original equipment manufacturers (OEM's) ultimately responsible for operation of the assembly facilities and production of the vehicles. Due to increased competition and consumer demand, there is continuous pressure from the OEM's for lower cost and higher efficiency assembly systems (higher vehicle or unit per hour throughput) and for those assembly systems to be 100 percent operational in a shorter amount of time.

Due to the multiple assembly systems, equipment and components that require sequenced operation to assemble a vehicle (or other product), the design of the overall assembly line traditionally required many stages. For example, the final design of equipment, for example called "Time B" equipment, that relies on a supporting structure, for example called "Time A" equipment, traditionally could not be completed until the design of its Time A supporting structure is complete. Once the various Time A support infrastructure and individual assembly systems were designed, built and installed, a substantial portion of the commission or testing of the Time B equipment traditionally could not occur until all of the Time A support structure and equipment is delivered and installed at the OEM assembly plant. This is further complicated by OEM's typically awarding portions of the assembly line Time A and Time B equipment to many different suppliers to leverage the respective supplier's expertise. If a supplier falls behind in the design, build or installation of Time A equipment, that can delay Time B equipment suppliers causing a cascading of delays through the remainder of the design, build, installation and commission stages. It would be further advantageous to have as many of the assembly equipment and systems be generic or non-model specific. That is, these systems and equipment may be used to build most or all variations of a product or vehicle which may have different models or features. These non-model specific systems and equipment (Time A) could then be fabricated, installed and commissioned even when final decisions about the product to be produced have not been made (which affect the Time B non-generic or model-specific assembly equipment and systems).

It has further been time consuming and costly for vehicle OEM's to change over an assembly plant or assembly lines to a new vehicle model or different vehicle altogether. Even simple to moderate changes to the assembly line equipment infrastructure can take days or weeks to complete leading to costly production downtime.

Prior assembly systems have employed specific assembly plant layouts to decrease the plant floor space required and increase efficiency in operations and vehicle throughput. For example, the ComauFlex system, produced by the same assignee of the present invention, has been widely employed by OEM's the details of which can be reviewed in U.S. Pat. No. 8,201,723 the entire contents of which is incorporated herein by reference and briefly discussed below. Details of variations of the ComauFlex assembly plant layout systems can further be found in U.S. Pat. Nos. 8,869,370; 8,713,780 and U.S. Patent Application Publication 2012/0304446 all assigned to assignee of the present invention and all incorporated herein by reference. These prior systems further reduced the need to store to-be-installed components and subassemblies next to the assembly line and specific assembly stations or cells which cluttered the assembly floor and complicated logistics.

Prior assembly systems have employed some modular vehicle assembly subsystems which provided advantages in new installations and accommodating batch and random vehicle builds where different vehicle models or types of vehicles could be built along the same assembly line with reduced changeover time. Prior assembly subsystems have employed modular robotic assembly stations or cells which could be placed end-to-end to accommodate a specified assembly line or series of operations. For example, each assembly station or cell included a modular, precision-manufactured to close tolerances scaffold frame structure and could be selectively equipped with the necessary number of industrial, multi-axis robots and end effectors for a specified assembly operation. Details can be found in the above-referenced U.S. Pat. Nos. 8,201,723; 8,869,370; 8,713,780 and U.S. Patent Application Publication 2012/0304446 all incorporated herein by reference.

Despite the numerous efficiencies and advantages prior assembly systems provide, many of the above-referenced complexities and disadvantages continue in the design, build, assembly and commission of these equipment and process subsystems, and the assembly system as a whole, in the field. For example, peripheral equipment used in vehicle assembly, for example liquid sealant dispensing devices and fastener feeders, required to support the robot assembly operations at a particular assembly station are traditionally placed on the plant floor and separate conveying systems required to transfer the sealant or fasteners to the robots positioned in the assembly cell for use. As another example, where floor-mounted robots are needed in an assembly cell, much time and effort is traditionally needed to precisely locate and mount the robots in positional relation to the other robots and equipment in the assembly cell. As another example, safety fencing used around an assembly line or cell cannot be designed and tested until most of the assembly cell equipment is designed and installed at the assembly facility.

BRIEF SUMMARY

Examples of the present invention include a modular vehicle assembly line having a plurality of assembly cells having modular systems and equipment which improves on the above complexities and disadvantages in prior assembly systems and methods.

In one example of the invention, a modular application equipment (AE) support pallet device is selectively used to elevationally support and secure application equipment, for example liquid sealant storage tanks and distribution pumps, above the assembly line and assembly tools, for example robots. The modular pallet is selectively connected to the assembly cell frame directly adjacent to, or in close proximity to, the robot (or other assembly tools or equipment) using the specific application equipment and further provides a simple logistical path to convey the consumable material, sealant, fasteners etc. directly into the assembly cell and the robot for application. In an example of a method of the invention, the modular pallet device can be pre-constructed and shipped to the application equipment supplier wherein the application equipment can be mounted and tested at the supplier prior to delivery and installation at the assembly plant. Power, data and material conveying cables and hoses for the mounted application equipment can simply be connected to coordinating equipment at a system integrator's facility or directly at assembly plant for a "plug and play" device enabling efficient installation, connection and commission/testing at the assembly plant.

In another example of an aspect the invention, a modular assembly tool (AT) platform or tray is provided to easily locate and secure required assembly tools and associated AE devices to the modular assembly cell infrastructure. In one example, a floor-level modular robot platform is provided. In the example, an industrial programmable robot, control cabinet and associated accessory devices are preinstalled on a modular AT platform or frame which coordinates with the existing modular assembly cell infrastructure. The modular support platform similarly allows the equipment to be pre-tested prior to arrival at the system integrator or assembly plant and provides quick and precise positioning with the existing modular assembly cell infrastructure. The simple, secure and precise positioning of the robot relative to the platform, and the platform relative to the assembly cell or station, provides immediate, predictable and highly repeatable location of the robot to the other assembly cell equipment greatly reducing the time and effort to positionally orient, program, and calibrate the robot over traditional devices and methods. The exemplary modular AT platform further provides secure and predictable positioning of AE devices relative to the robot, for example weld tip dressers for spot welding gun end effectors connected to the robots, further adding to plug and play advantages on installation at the assembly plant as described above.

On the need for significant maintenance of the application equipment, or a model changeover at the assembly plant, the modular AE pallets and AT platforms having non-model specific or model-specific AE devices and assembly tools are simply "unplugged" from the non-model specific assembly structures and replaced with the new, refurbished and/or AE devices or assembly tool equipment for the new vehicle model that has been tested/commissioned prior to arrival at the assembly facility or line.

In another example of an aspect of the invention a modular guard fence is used with one or more aspects of the modular assembly station and modular inventive aspects noted above and discussed below. In an example, the guard fence includes a frame that is cantilevered from the assembly frame and, may, but in a preferred aspect, does not require connection to an assembly plant floor which was expensive and time consuming in conventional safety fences and guards. The exemplary fence includes an upper position and a lower position allowing selective access to assembly tools in the assembly station. In one example, a front panel is positioned between the assembly tools and control cabinets and AE devices of an AT platform. This prevents unauthorized access to the assembly tools while allowing access to the control cabinets and selected AE devices while the assembly tools are in operation.

In another example of an aspect of the invention a method of establishing and purchasing a vehicle (or other product) assembly line is presented. In the example, an assembly plant throughput is established and the number of individual assembly lines forming the complete assembly line is determined. The throughput for each assembly line is calculated to meet the overall throughput target. The required assembly line equipment and services are divided up into non-model specific infrastructure equipment and services that are non-vehicle model specific and vehicle model-specific systems.

The non-model specific systems may include the modular frames, conveyors and AE pallets and AT platforms. The non-model specific equipment is singly sourced to a supplier or a minimal number of suppliers. The vehicle model-specific assembly equipment is competitively bid, preferably on an individual assembly line by assembly line basis, the supplier awarded the individual line or lines being responsible for meeting the individual line throughput specification.

The method provides at least the advantages of simultaneous and parallel design activities for non-model specific and model specific equipment, immediate design release of the modular non-model specific technical details of the assembly lines, increased commission of the equipment at the suppliers and rapid installation and final commission at the assembly plant through connection of the modular assembly line components and application equipment mounted thereto. This results in compressed timing to design and install an assembly facility at lower cost and overall lowered business risk which is more evenly shared between the OEM and suppliers awarded portions of the business.

Other applications and aspects of the present invention will become apparent to those skilled in the art when the following description providing examples of the invention are read in conjunction with the accompanying drawings described below.

BRIEF DESCRIPTION OF THE DRAWINGS

The description herein makes reference to the accompanying drawings wherein like reference numerals refer to like parts throughout the several views, and wherein:

FIG. 5 is a perspective view schematic of an example of the modular application equipment pallet device and exemplary application equipment devices mounted thereon;

FIG. 6 is an enlarged perspective view schematic of the area marked "A" in FIG. 5;

DETAILED DESCRIPTION OF EMBODIMENTS OF THE INVENTION

Examples of a modular vehicle assembly system and methods 10 are described below and illustrated in FIGS. 1-16. The exemplary assembly devices and systems are described as useful in high quantity assembling automotive passenger vehicles, but there are other applications for manufacturing and assembling other vehicles and products known by those skilled in the art.

Figure 1:
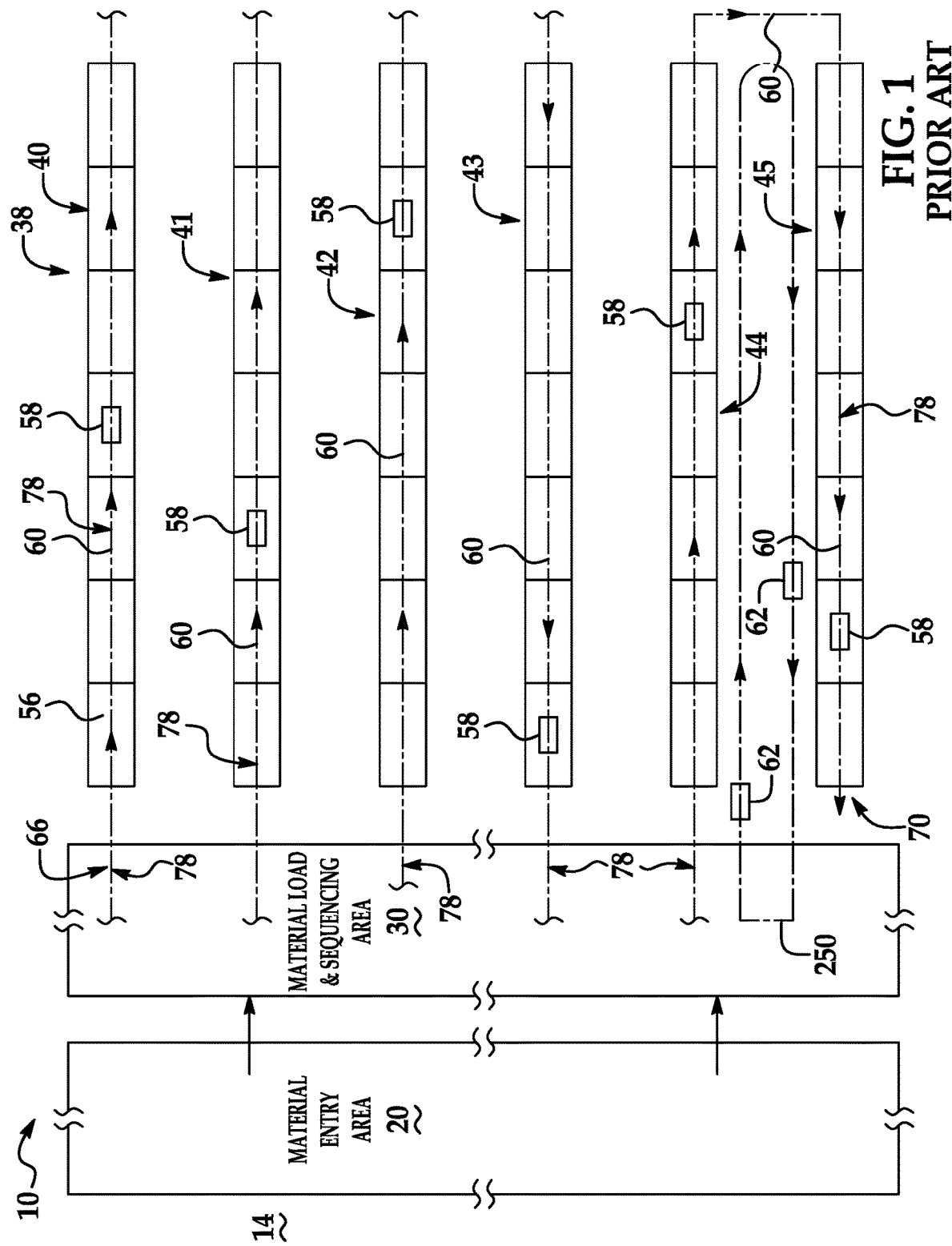
FIG. 1 is a schematic of an example of a prior art vehicle assembly plant layout and assembly lines.

Referring to FIG. 1, a known vehicle assembly line for producing sheet metal skeletons of passenger vehicles known as "body-in-whites" (BIW) is shown on an assembly plant floor 14. In the example, a material entry area 20, a material loading and sequencing or staging area 30, and a plurality of assembly lines 38 (six shown in FIG. 1 and identified as 40-45 as illustrated). Each assembly line 38 includes a vehicle-in-process travel path 60 running down each line 40-45.

Figure 2:
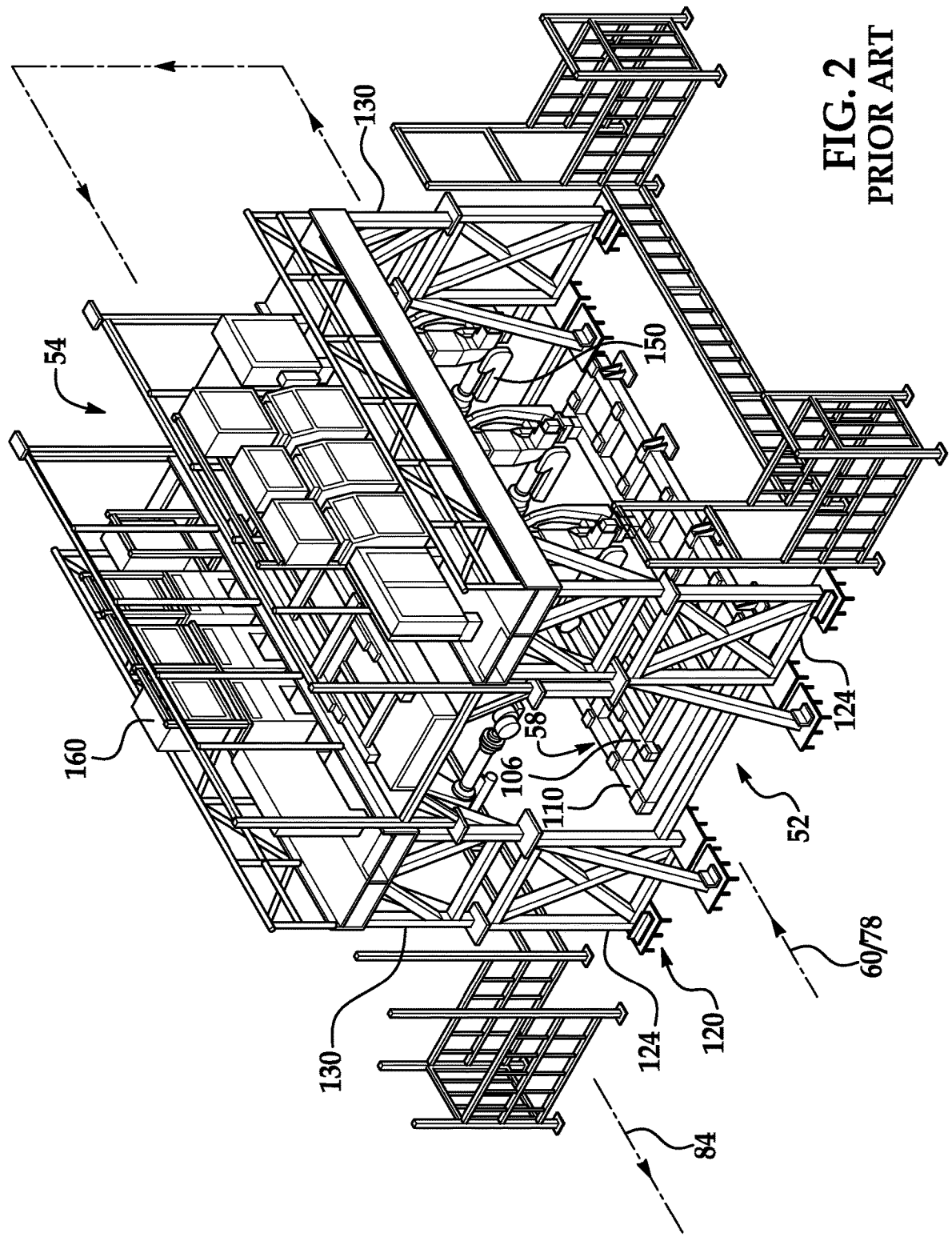
FIG. 2 is a perspective view schematic of one example of a prior art vehicle assembly station having a pallet-style vehicle conveyor.

In the examples shown, two types of vehicle conveyors are particularly, but not exclusively, useful for transporting the partially completed vehicle body along path 60 and through assembly stations or cells 56. As generally shown in FIG. 2, a pallet 106 generally supports a partially completed vehicle body (not shown). The pallet 106 is selectively moved along path 60 on a rail frame 110 having powered rollers to selectively move pallet 106 from assembly cell to assembly cell. An example of a powered pallet system is Comau LLC's VersaPallet brand system. Additional details can be found in U.S. Pat. Nos. 6,564,440 and 6,966,427 which are incorporated herein by reference.

Figure 3A:
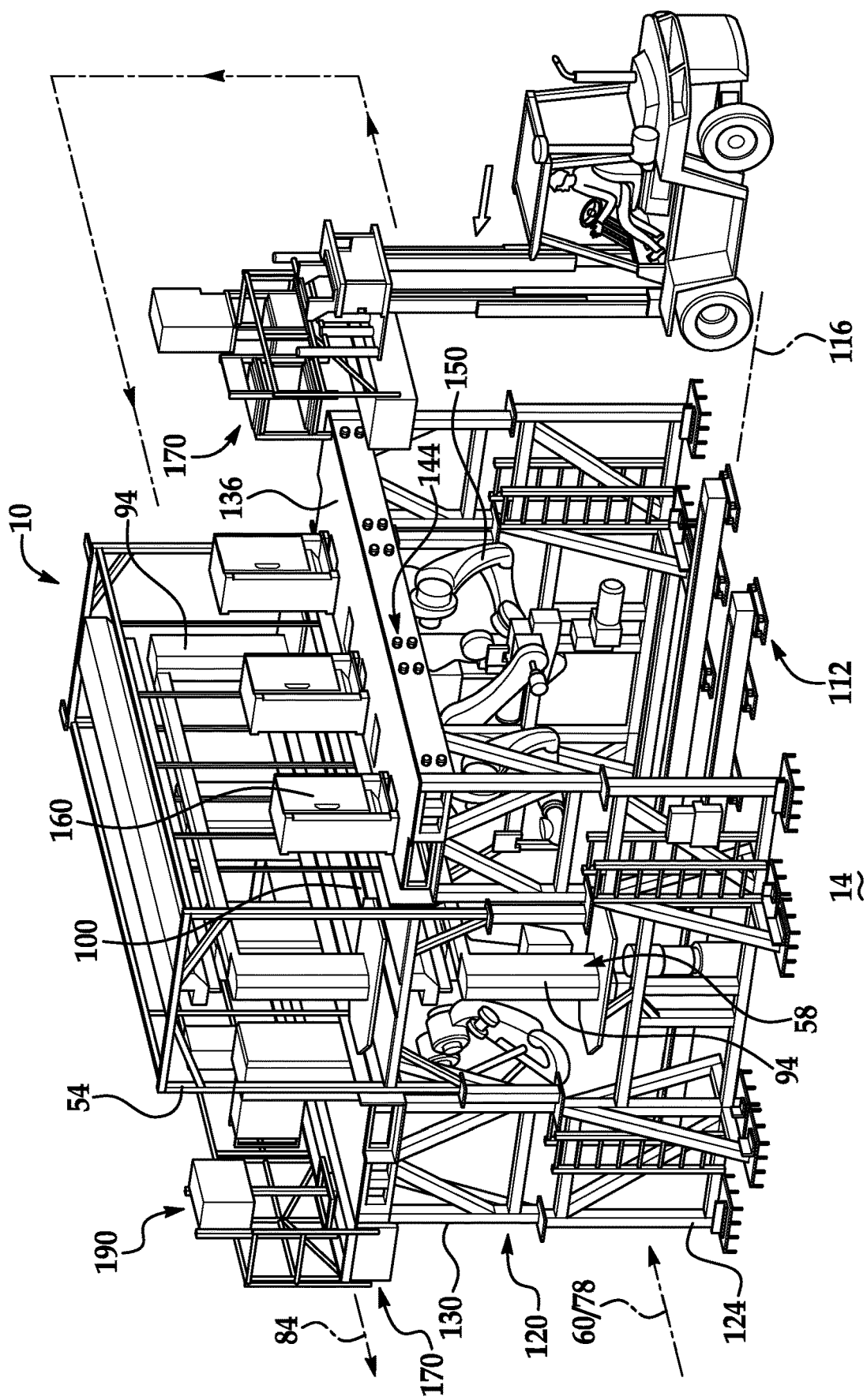
FIG. 3A is a perspective view schematic of an example of a modular vehicle assembly station of the present invention with an exemplary overhead-style conveyor and peripheral support device being installed.
Figure 3B:
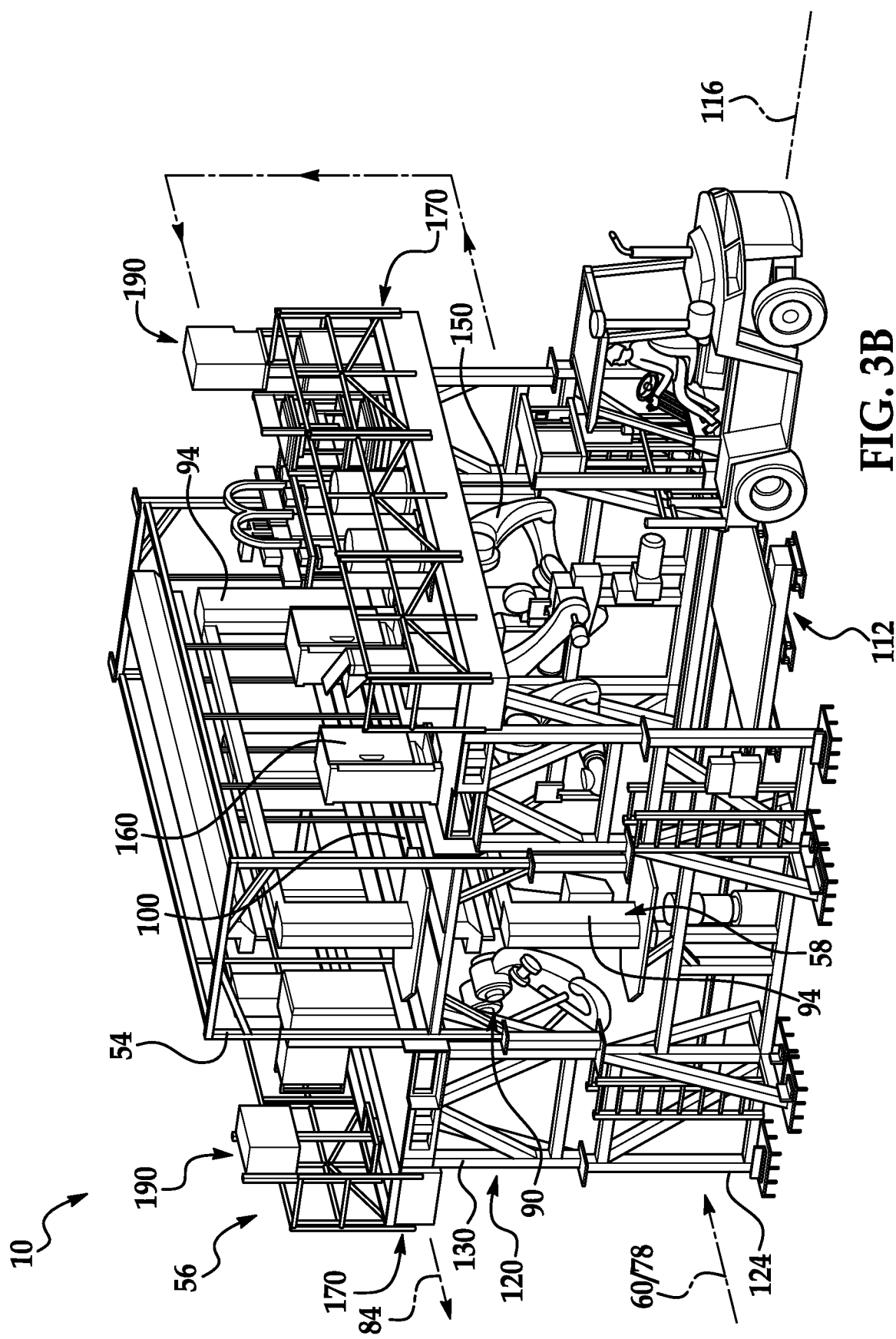
FIG. 3B is an alternate perspective view schematic of the example shown in FIG. 3A with several modular pallet devices installed on both sides of the assembly station.

As generally shown in FIGS. 3A and 3B, a useful overhead conveyor is Comau LLC's VersaRoll® brand conveyor including powered rollers along an upper frame rail which engage and move a downward extending carriage along path 60 through the assembly cells 56. Additional details can be found in U.S. Pat. Nos. 6,799,673; 6,564,440 and 6,719,122 which are incorporated herein by reference. A useful system to monitor the position and stop the pallets 106 or overhead carriers 90 at desired positions in the assembly cells is Comau LLC's VersaCoder® system which uses a readable strip connected to the pallet/carriage and a reader. Further details can be found in U.S. Pat. No. 7,108,189 which is incorporated herein by reference.

In either a pallet-style 106 (FIG. 2) or overhead-style 90 (FIGS. 3A and B) vehicle conveyor or carrier, one or more exemplary assembly lines 40-45 may include a lower assembly path 60 and an upper return path 84 as generally shown. In the examples shown, the assembly operations, for example spot welding of sheet metal subassemblies and components, occur along the lower level in assembly cells 56 by programmable industrial, multi-axis robots 150 described further below. The upper return path of travel 84 may be used to return empty pallets or carriers to be restocked with components or fitted with a partially completed vehicle body for additional assembly. Where an upper return path 84 and conveyor is used, a lift (not shown) positioned at the end of an individual assembly line may raise, for example and empty carriage or partially completed vehicle body, from the lower path of travel 60 to the upper path of travel 84. Return of an empty transport carriage may occur if the partially assembled vehicle body is transferred to another carrier for continued assembly along downstream assembly lines.

In an alternate example not shown, depending on the vehicle or product to be built, the above referenced lift (not shown) may be positioned prior to the end of a line 40-45 to raise a partially completed vehicle to the upper path 84. Further, an elevated transverse conveyor (not shown) may move a partially completed vehicle body from an upper path 84 of one line 40-45 to an adjacent line for further build or assembly processes.

As best seen in FIGS. 3A and B, where an overhead conveyor 90 is used, a transverse tooling shuttle or conveyor device 112 may be used. The conveyor 112 allows for different tooling to accommodate different vehicle types to selectively move in and out of the assembly cell 56 along a path 116 that is substantially transverse to assembly path 60. Further details of assembly plant layout, assembly lines, tooling shuttles, component carts and carriers useful with the present invention can be found in U.S. Pat. Nos. 8,201,723; 8,869,370, 8,713,780 and U.S. Patent Application Publication 2012/0304446 all of which are incorporated herein by reference.

Other plant layouts, assembly cells, conveyors and tooling devices and methods known by those skilled in the art may be used with the present invention.

Referring to FIGS. 3A and B, an example of a modular vehicle assembly system 10 is illustrated. In the example, the system includes a pair of scaffold-like frames 120. In the example, frame 120 includes a lower frame module 124 on each side of the assembly line path of travel 60 as generally shown (one assembly line described hereafter for convenience). In a preferred example, the lower frame module 124 is manufactured and assembled to close dimensional tolerances and rigidly and removable secured to the plant floor 14 through threaded studs connected to mounting plates secured to the floor 14, typically concrete. In a preferred example, the lower frame modules 124 are precisely spaced laterally from a predetermined and known centerline of the assembly line 60 in the assembly facility. The longitudinal position of the lower frame 124 along the assembly line is also determined through known 3-dimensional coordinate reference positions in the assembly facility. These positions may be defined using a large template or jig using the assembly centerline.

Figure 12:
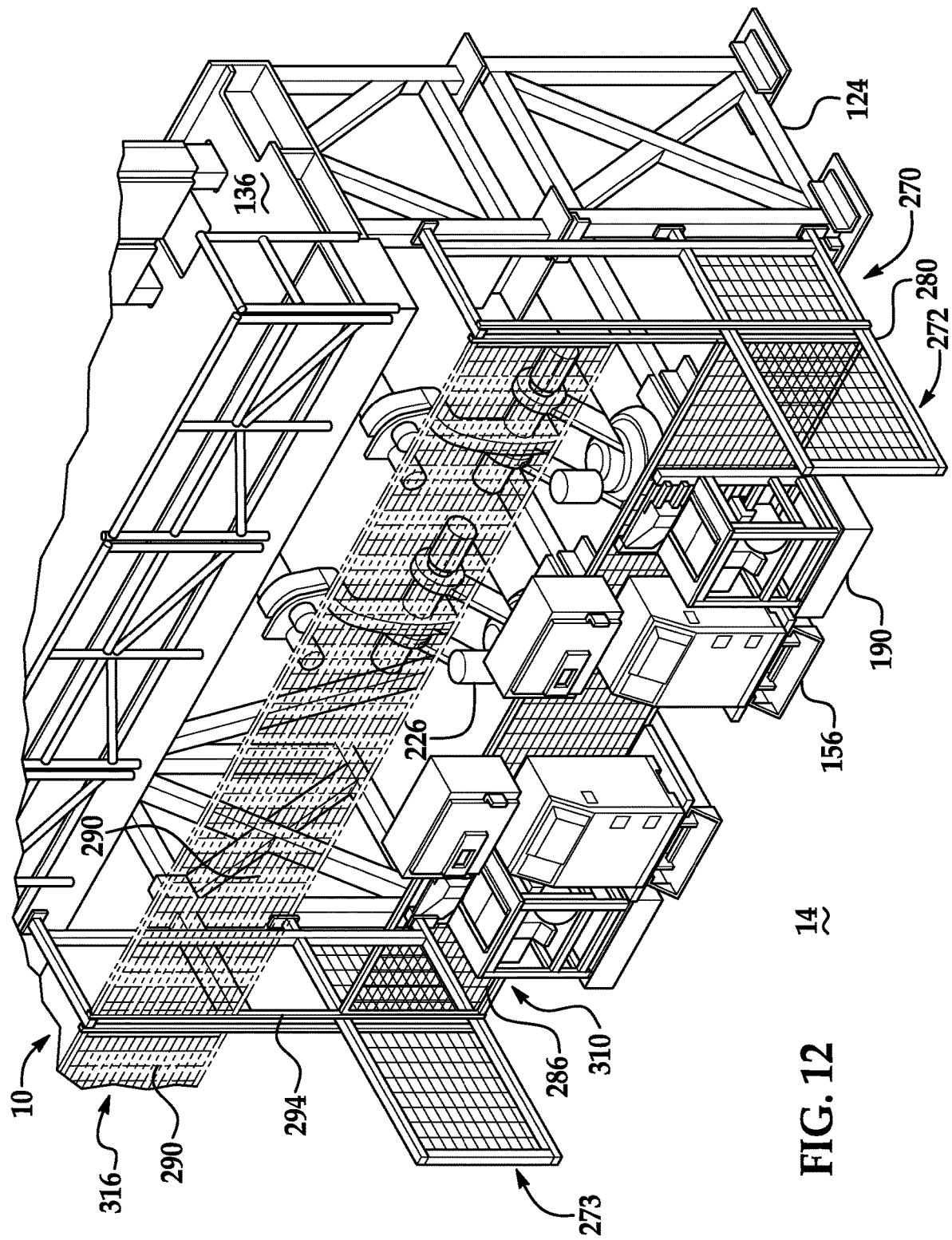
FIG. 12 is a perspective view schematic of an example of an assembly station protective fence and fence retraction device.

Using the predetermined assembly line center line and proper longitudinal position of the lower frames, in one example, an assembly cell reference center point 260 for the assembly station is determined as best seen in FIG. 12. In a preferred example, the predetermined reference point 260 provides an accurate and known location in the X, Y and Z dimensional coordinates from which other modular assembly system equipment for example the frames 120 are located from to support precision assembly operations along the assembly line.

In a preferred example, the lower frames 124 include an entrance point, for example the leading frame portion upstream, and an exit point, for example the trailing or furthest portion of frame 120 downstream. The lower frames 124 are precisely positioned longitudinally along path 60 from the known center or reference point 260 to provide a structurally rigid and dimensionally precise foundation for locating upper frames 130. The precision mounting location of the lower frames 124 along path 60 and precision mounting locations for the robots 150 connected to the frame 120 relative to the known reference point 260 of the assembly cell 56 provide accurate, precise and predictable orientation of the robots 150 for programming the movements of the robots 150 assigned functions in the assembly cell 56. In a preferred example, the lower frames 124 are non-model specific. That is, lower frames 124 are standard or generic and do not depend on which type of vehicle or vehicle body (or other product) will be built. The exemplary lower frames 124 are designed to handle or accommodate the building of substantially all passenger vehicles. In an alternate example, the lower frames would be standard or non-model specific for other products that may have options or variations that can be ordered by customers.

As best seen in FIGS. 3A, B, 5, 67, an exemplary pair of upper frames 130 is illustrated. Each upper frame 130 is preferably precisely fabricated to small or close tolerances and mounted atop a respective lower frame 124 as generally shown (one described hereafter for convenience). Upper frame 130 includes vertical legs and an elevated floor 136 longitudinally extending along and parallel to path 60 forming a rigid scaffold-like assembly frame. Floor 136 is of a width 140 which is preferably about 60 inches. Other widths 140 and dimensions of upper frame 124 suitable for the application and known by those skilled in the art may be used. Precision-machined mounting surfaces (not shown) provide mounting points for assembly tools, for example programmable robots, although other assembly equipment and/or tools may be used.

In the example illustrated, preferably three inverted multi-axis industrial robots 150 attach to the underside of floor 136 and extend down below floor 136 as generally shown. The upper frame 130 precision mounting surfaces accurately and precisely position the robots 150 relative to the upper 130 and lower 124 frames and assembly cell center point 260 providing a high level of dimensional and locational predictability and repeatability in the initial installed position and orientation of robots 150 with respect to the assembly cell for programming and operation. Alternately, precision located mounting holes are provided in the upper frames 130 to accept modular robot mounting plates (not shown). The mounting plates, for example, can be connected to the robots at the integrator's (i.e. vendor/supplier) facility with easy and precise connection to the upper frames 130 when installed in the assembly plant.

In a preferred example not shown, tapered locating pins may be installed on the upper portions of the lower frame 124 and coordinate with apertures or other details in the mating upper frame 130. The tapered locating pins may be used to guide and position the upper frame 130 into 3-dimensional X, Y and Z precision location relative to the lower frame 124 and then secured in place with large bolts, other fasteners or other securing methods known by those skilled in the art.

Lower 124 and upper 130 frames are preferably made from welded steel elements although other materials known by those skilled in the art may be used. It is understood that lower 124 and upper 130 frames may take other sizes, shapes and configurations than that shown consistent with the above description as known by those skilled in the art.

As best seen in FIGS. 2 and 3A, B, the power and controls for each robot 150 are preferably housed in control cabinets 160 secured to upper frame floor 136 as generally shown. Other positions of the cabinets 160 suitable for the application and number of robots 150 (or other assembly tools and equipment) for a particular assembly cell 56 known by those skilled in the art may be used.

Referring to FIGS. 4-8, an example of a modular application equipment (AE) pallet or support 170 is illustrated (three (3) shown in FIG. 5). As best seen in FIG. 5, in the example, AE pallet 170 includes a mounting surface or top 174 having a width 176 and vertical joists or supports 180 (three shown per pallet) as generally shown. AE pallets 170 may include a bottom 182 forming a rectangular pallet-like structure. AE pallet may further include a back panel (not shown) and a front panel (not shown). Although mounting surface 174 is shown as a top or upper surface, it is understood other mounting surfaces, configurations and orientations known by those skilled in the art may be used.

In the exemplary AE pallet 170, mounting surface 174 is a rigid panel having a plurality of through holes or slots, mounting bosses, weld nuts and/or other features for mounting application equipment (AE) 190 suitable for the assembly operations in the assembly cell 56 and most preferably for a particular assembly tool, for example a robot 150. For example, mounting surface 174 can be a rigid steel plate with holes positioned in a 100 millimeter grid pattern for ease of positioning and securing all types of AE devices 190. In a preferred example, where three (3) inverted robots 150 are connected to upper frame 130, three (3) AE pallets 170 are preferably used providing the respective AE device 190 needed to support the respective robot 150 assigned an assembly task. As seen in FIG. 5, three (3) different forms of AE devices 190 are illustrated. In the middle AE pallet 170, a fluid storage and dispensing system 194 is secured to top 174 as generally shown. Consumable fluid materials such as sealants, adhesives, coolants and lubricants are common in vehicle body assembly lines. Although not necessarily consumable, coolant or lubrication fluids such as water are considered consumable materials for purposes of the invention.

The far right AE device 170 has a consumable materials fastener feeder 198 connected thereto. Such fastener feeders may include consumable rivets, weld studs, weld nuts, screws and other fasteners common to vehicle body operations known by those skilled in the art. The far left AE support 170 includes a third application equipment, for example a welding controller for a resistance spot welding of aluminum application. Other AE devices 190 needed to support common vehicle body (or other product) assembly operations may include equipment necessary to support welding operations including, but not limited to, resistance spot, seam, laser, brazing, piercing and clinching operations. Examples of consumables for seam or brazing operations may include welding wire or electrodes that are selectively fed by a feeder to the assembly tool in the assembly station as further described below. It is understood herein that reference of supply of consumable or other materials from the AE devices to the assembly tool, for example a robot, also includes the supply to any end effector or other tool connected to the assembly tool. Other AE devices 190, and consumable materials used thereby, known by those skilled in the art may be packaged and secured to a respective AE pallet 170. Although described as useful with robots 150, it is understood that AE devices 190 can be used with other assembly tools and equipment needed to support assembly and manufacturing line processes and operations known by those skilled in the art.

Figure 7:
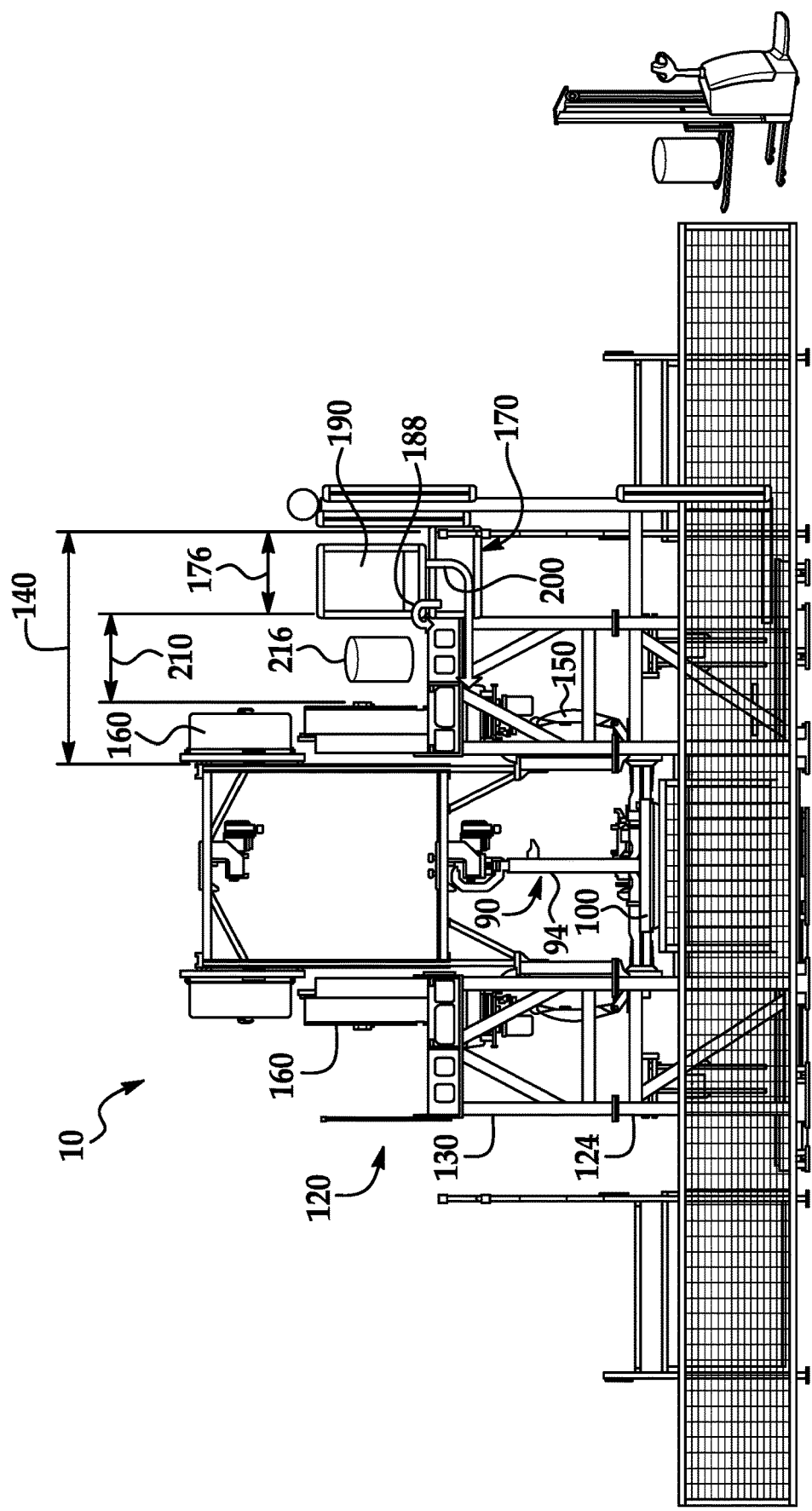
FIG. 7 is a schematic end view of an example of a modular vehicle assembly system station.

Referring to FIGS. 5 and 6, one example of an AE pallet connector 186 is illustrated. In the example, AE pallet 170 includes hooks 188 rigidly mounted to two or more vertical supports 180 as best seen in FIG. 6. Exemplary hooks 188 laterally extend outward from vertical supports 180 and engage cooperating structures, for example slots 144 in a laterally outward facing surface 142 of upper frame 130 forming a localized lateral continuation of floor 136 as best seen in FIG. 7. Alternately, the coordinating mounting holes may be in the floor 136.

Figure 9:
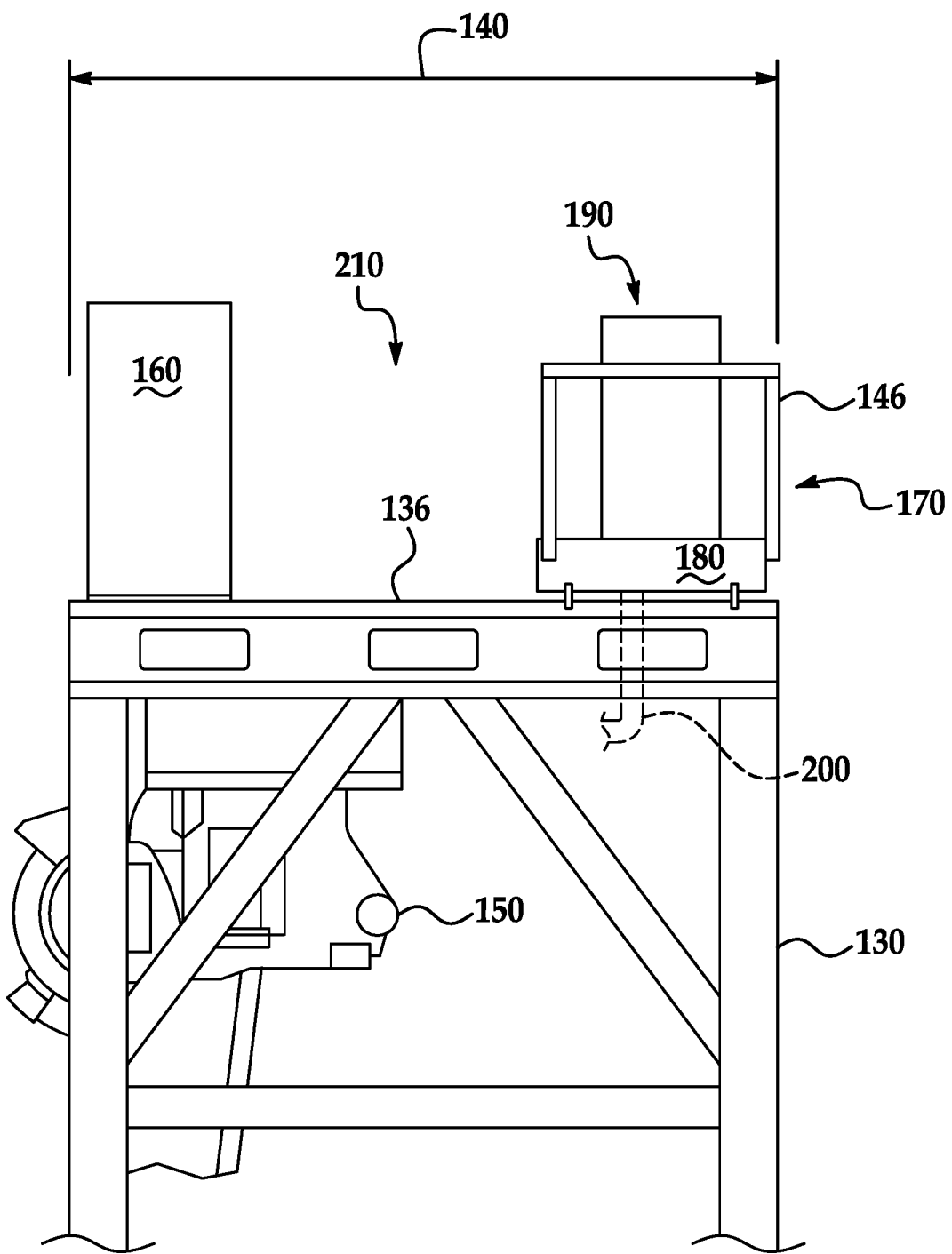
FIG. 9 is a schematic end view of an alternate example of a modular application equipment pallet device mounted atop of an exemplary frame structure.

Referring to FIG. 9, an alternate example of mounting AE pallet 170 to upper frame 130 is shown. In the example, AE pallet 170 is mounted atop upper frame floor 136 through mechanical fasteners as generally shown (space shown between 170 and 136 for ease of illustration). In this configuration, the width 140 of upper frame 130 may be increased (not shown) to accommodate the width 176 of AE pallet 170 while allowing adequate space for walkway 210 as described below. Other structures, orientations and fastening methods for removably mounting AE pallets 170 to upper frame 130 known by those skilled in the art may be used.

In the examples, AE pallet 170 is configured to form a pallet-like support structure for any AE device 190 to provide consumable materials, other materials, or services (for example electrical power, fluids or data) to the assembly line, preferably adjacent exemplary industrial robots 150. In a preferred example, pallet 170 width 176 is approximately 36 inches. In a preferred example, the combined widths 140 of upper frame 130 floor 136 and width 176 of AE support are less than 96 inches which is the standard width of a commercial boxcar shipping container. Other widths 140 of floor 136 and AE pallet 170 may be used to suit the particular application and assembly line environment. It is also in the scope of invention that the widths can comprise two or more pieces for ease of shipping and then assembled at the system integrator or on site at the assembly facility.

The exemplary pallet 170 is preferably configured, oriented and adapted to be lifted, carried and elevated by a forklift common in assembly plants. In one exemplary use, the modular AE pallets 170 are shipped "empty" to a supplier/vendor responsible for providing AE devices 190 to support assembly operations in one or more assembly cells 56 along one or more assembly lines 38-45. The vendor can design and package the AE devices 190 in the space provided by the modular pallet 170, securely mount the AE device 190 to the top 174 and fully test and commission the operation of the equipment at the supplier's facility thereby providing tested and ready to use equipment on installation at the assembly plant. It is understood that AE devices 190 may be mounted in other orientations with respect to pallet 170, for example connected to the underside of top surface and extending downward. Other mounting and orientations of AE devices 190 to pallets 170 known by those skilled in the art may be used.

As best seen in FIGS. 4A-D, the modular design of AE pallets 170 provides for several configurations depending on the assembly operations for a particular assembly station 56. As best seen in FIGS. 3A and 4A-D, where an AE pallet 170 and AE device 190 is desired to be installed to upper frame 130, a safety rail 146, normally installed to upper frame surface 142 or floor 136, is simply disconnected from upper frame floor 136 and mounted to rail connection points (not shown) on AE pallet 170 as generally shown. Securing AE pallets 170 and reconfiguring the AE devices 190 for assembly cell 56 can be done in a matter of minutes versus hours or days with conventional assembly systems.

Figure 8:
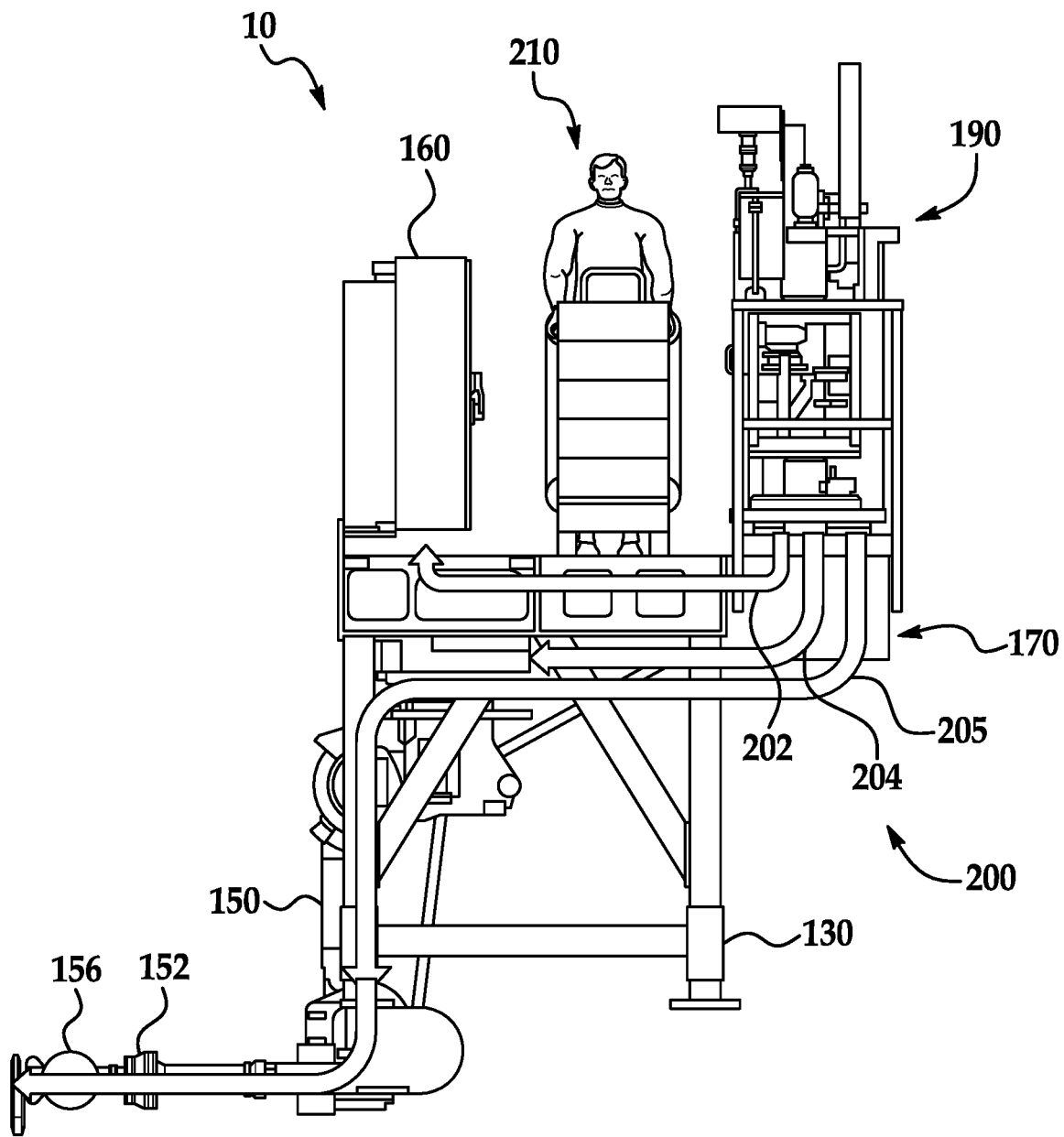
FIG. 8 is an alternate and enlarged portion of FIG. 7 showing connection of an exemplary application equipment pallet device.

Referring to FIGS. 5, 7 and 8, an example of a conduit 200 is shown. Conduit 200 includes one or more of cables, wiring harnesses and/or pipes, 202, 204 and 205 positioned between the AE devices 190 and the assembly cell are shown. In the example, conduit 200 may be a single or multiple conduits/cables/pipes 202, 204 and 205, used to route, for example, an electrical and/or data cables 202 for the transfer of electrical power and information data from the control cabinets 160 to supply the necessary electricity and data to the AE devices 190 to, for example, power a fluid distribution pump 194 to supply pressurized adhesive or sealer to robot 150 or other assembly tools or cell equipment. As best seen in FIG. 8, conduit 200 may include a cable 204 connected between the AE device 190 and the assembly tool exemplary robot 150 to provide consumable materials and other materials, data and services to the assembly tool robot in order for the robot to perform the predetermined and preprogrammed assembly tasks in coordination with the application equipment 190 in the assembly cell.

In a preferred example, where a robot 150 uses consumable materials, for example rivets, screws, or weld studs, to perform the predetermined assembly task, conduit 200 may include a pipe 205 is connected to the AE device 190 and routed through or around the AE pallet 170, under upper frame 130, through or around robot wrist 152 to the end effector 156 for the routing of consumable materials to assist assembly operations for that particular assembly tool. For example, it is common along vehicle body assembly lines to install adhesives, sealants and weld studs to the partially completed vehicle body in assembly cell 56. Where a robot 150 is tasked with welding operations, the fluid dispensing system 194 may provide water or other fluids to cool the equipment for continuous operation. Additional AE devices may be installed on the same AE pallet to further support, for example, a seam welding robot through feeding of consumable welding electrode through conduit 200 to support the welding operation. It is understood that conduit 200 could be a pipe or casing separate from the individual cables/wires and pipes described above, or may simple be the cables/wires and pipes themselves.

In the example where an AE pallet 170 includes fastener AE devices 190, conduit 200 may include hoses or pipes for the transport of fasteners into the assembly cell. In a preferred example, AE pallet 170 includes one or larger routing apertures (not shown) in top 174 and open face 178 for the ease of routing conduit 200 laterally toward upper frame 130. The assigned robot 150 or other assembly cell tools would include the appropriate coordinating and reciprocal connectors so conduits 200 and/or 202, 204 and 205 can be rapidly connected for communication of consumable materials, data and other items on installation of the modular AE pallet 170 to upper frame 130 as described. Other communication lines, conduits and routing techniques and connections known by those skilled in the art may be used. For example, the conduit 200 may simply be routed around the AE pallet floor versus through apertures in the floor as described.

It is understood that conduit 200 may come installed with the AE pallet and AE device as transferred into the assembly facility or may be largely, if not wholly installed in the assembly station. In the latter example, the AE device 190 may have a short conduit or simply connectors on the AE device 190 so it can be rapidly connected and placed in communication with the assembly cell control cabinet and/or the assembly tool in the manners described. I combination of conduits 200 is also contemplated. For example, both the assembly station and AE device may have a conduit with coordinating connectors which are engaged on installation of the AE pallet to the frame. It is also contemplated that the AE pallet 170 comes "pre-wired" and includes coordinating connectors on the pallet 170. For example, the pallet 170 may have common connectors or a bank of plugs wherein the AE device plugs into the pallet 170. On installation of the AE pallet to the assembly frame, wires/cables and pipes preinstalled in the assembly station are routed and plugged into another bank of connectors/plugs which place the AE device 190 in communication with the assembly tool and control cabinets in the manners described. Other structures and methods of connecting the AE pallet and AE device in communication with the assembly station known by those skilled in the art may be used.

There are numerous advantages to the modular AE pallet system as described and illustrated. For example, if the mounted first AE device 190 fails and it is too time consuming or costly to repair or replace the first AE device 190 on site at the assembly line, the entire first pallet 170 can be disconnected and replaced with a replacement first modular pallet 170 with a pre-installed and tested replacement first AE device 190 with minimal assembly line downtime and logistical disruption. This modularity and plug and play connectively will greatly reduce critical downtime of the assembly line for repairs, replacement and time-consuming maintenance of application equipment 190.

The modularity also is a major advantage for vehicle model and other product changeovers requiring reassignment of a robot 150 assembly operation or other assembly line tools/equipment. For example, a second AE pallet 170 with a second AE device 190 suitable for the new assembly tool or operation can be quickly mounted to upper frame 130 through a forklift or existing gantry crane and connected to the retasked or new assembly tool through conduit 200 as described above. In a preferred example, the second AE pallet would be the same modular AE pallet 170 used with the first AE device, but having a different, second AE device 190 connected to it suitable for the alternate assembly operation by the assembly tool. It is contemplated that more than one type or form of modular AE pallet 170 may be used to accommodate the various AE devices 190 or assembly line operations.

The elevation of the application equipment 190 further removes such equipment from traditional placement on plant floor 14 and routing of the communication or support lines up to the inverted robots 150 which typically required dedicated frames to support and route the lines, for example hoses and fastener conduits.

In a preferred system 10 and application of AE pallets 170 and application equipment 190 shown in FIGS. 7, 8 and 9, the dimensional size of floor 136 and the placement of control cabinets 160 and application equipment 190 preferably provides for a walkway 210 along floor 136 longitudinally along upper frame 130. In one example, this is advantageous for access and maintenance of systems in the control cabinets 160 and AE devices 190 positioned thereon or connected thereto. Further, as the AE device 190 which provides consumable items such as adhesives and fasteners to the assembly cell, these consumable materials need to periodically be replenished. Walkway 210 provides a pathway for operators (see FIG. 8) to maneuver and restock these consumables for continuous assembly station operation. As an example shown in FIGS. 7 and 8, a drum of fluid can be raised by a forklift and installed atop floor 136. A dolly or cart can be used by an operator to move and replace an empty fluid storage container for a fluid dispenser 194. Where fasteners need to be replenished, an operator can manually carry a box of fasteners and load them in the application equipment hopper for future distribution to the robot 150 by the application equipment 190 and conduit 200 as described.

Figure 4A:
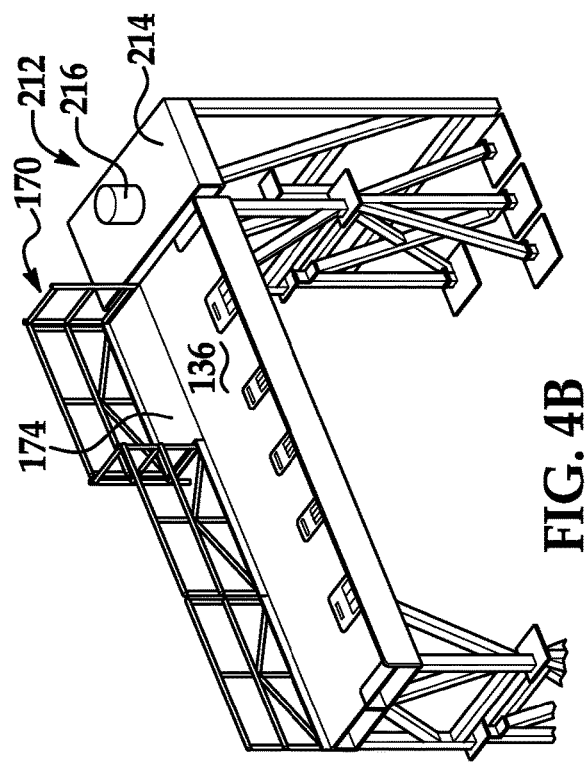
FIGS. 4A-D are alternate examples of configurations for one example of the modular application equipment pallet devices.
Figure 4B:
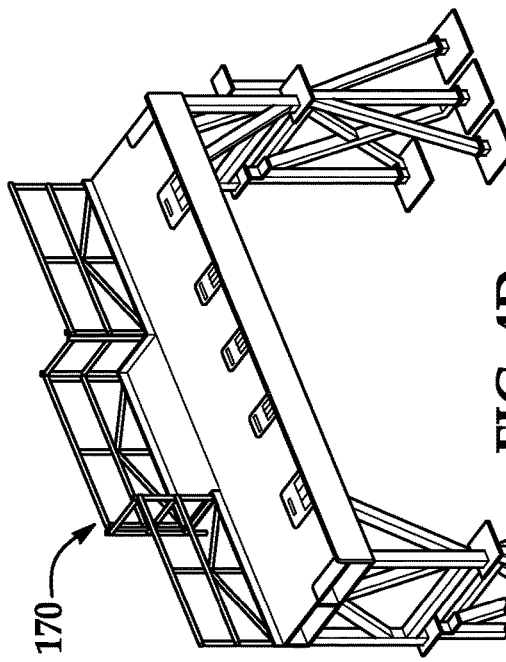
Figure 4C:
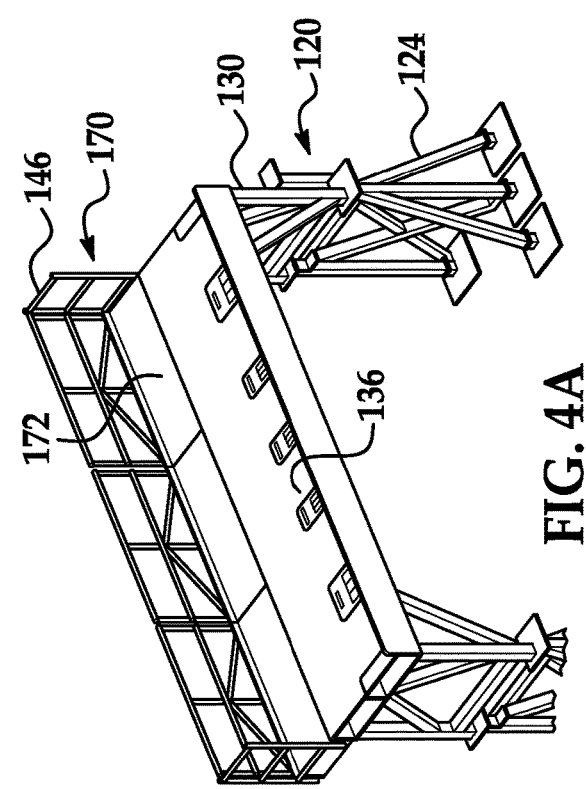
Figure 4D:
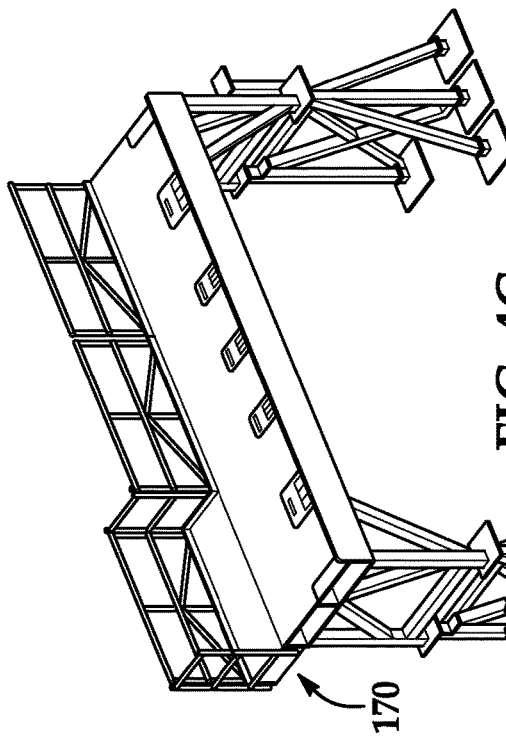

Referring to FIG. 4B, an example of a distribution deck 212 is shown. Distribution deck 212 is used to assist in the supply or replenishment of consumables, for example, adhesives, sealants, fasteners and other materials that are used by the various AE devices 190 mounted on AE supports 170. In the example shown, deck 212 is positioned at one or both ends of an assembly line 40-45 (FIG. 1) and has a platform which is preferably directly adjacent and at the same elevation as floor 136 of the upper frame 130 and in the exemplary AE pallet floor 174 shown in FIGS. 4, 7 and 8. In the example deck 212, consumables, for example 55 gallon drums of sealant 216 for use in fluid distribution device 194, would be raised up to platform 214 by a forklift or other device and deposited on the platform. Operators can manually, or through aid of a moving device, move by hand cart the consumables deposited on deck 212 along path 210 to the appropriate AE pallet 170 where the consumables are needed. This is very advantageous for continuous operation of the AE devices 190 and assembly station 56. The position of the AE devices 190, consumables 216 and workers above the assembly cell 56 for this work is very advantageous for plant logistics, efficiency and safety. Other methods of depositing the consumables 216 on platform 214 and movement along path 210 may be used as known by those skilled in the art.

Referring to FIG. 1, in a most preferred example, a distribution deck 212 would be provided at one end of each assembly line 40-45 adjacent to the material load and sequence area 30. In one example, distribution deck 212 may be continuous and span several or all assembly lines 40-45 or be individual to each line where consumables are needed to support assembly operations. The consumables 216 would travel the least distance from the material entry area 20 to the assembly line and thus further simplify assembly plant floor congestion and logistics. Other configurations and locations of distribution deck 212 known by those skilled in the art may be used without departing from the present invention. It is further understood that distribution deck 212 may serve other purposes than receipt of consumable materials as known by those skilled in the art.

Figure 10:
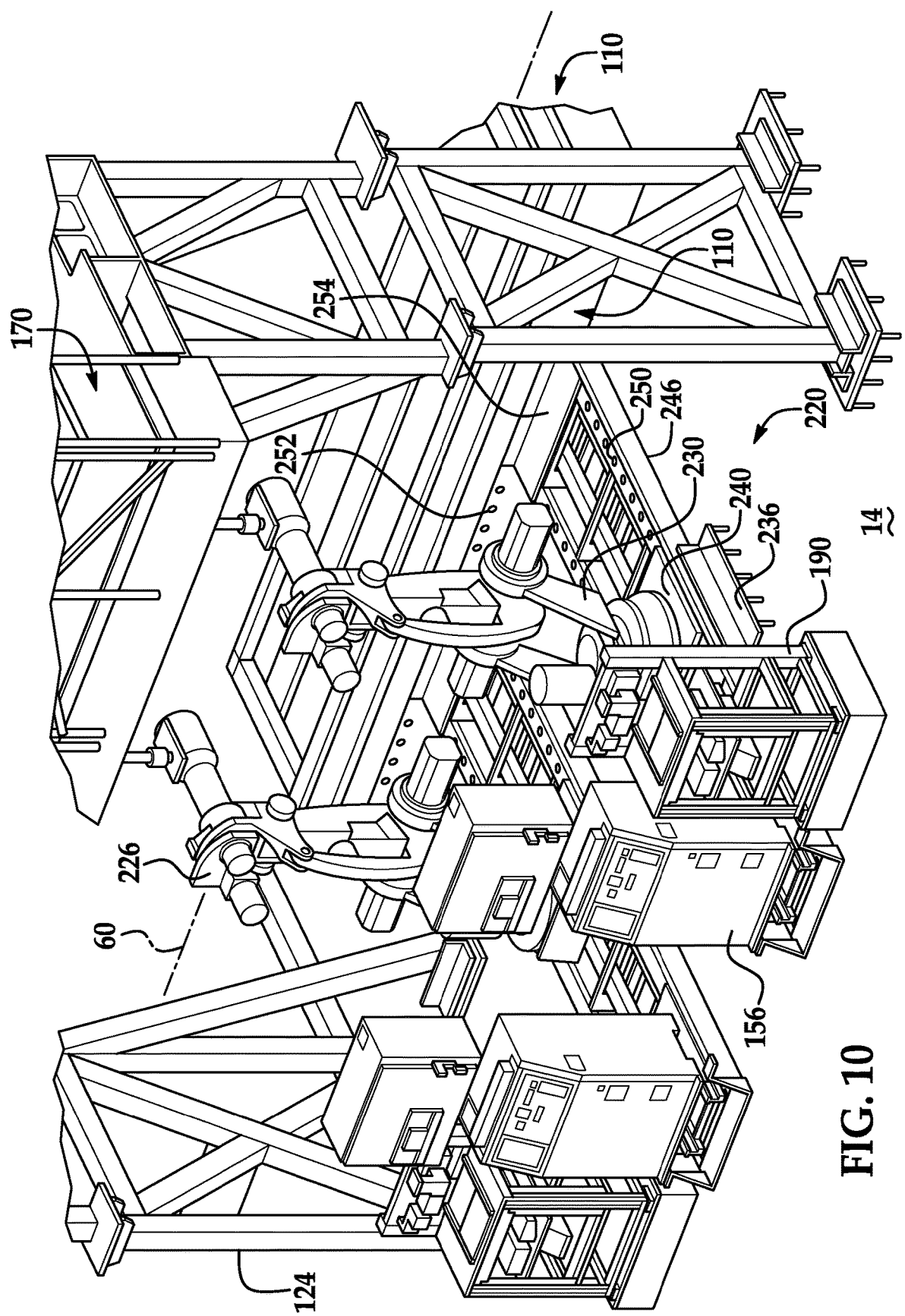
FIG. 10 is a perspective view schematic of an example of a modular application equipment platform with a robot connected to a pallet-type conveyor.
Figure 11:
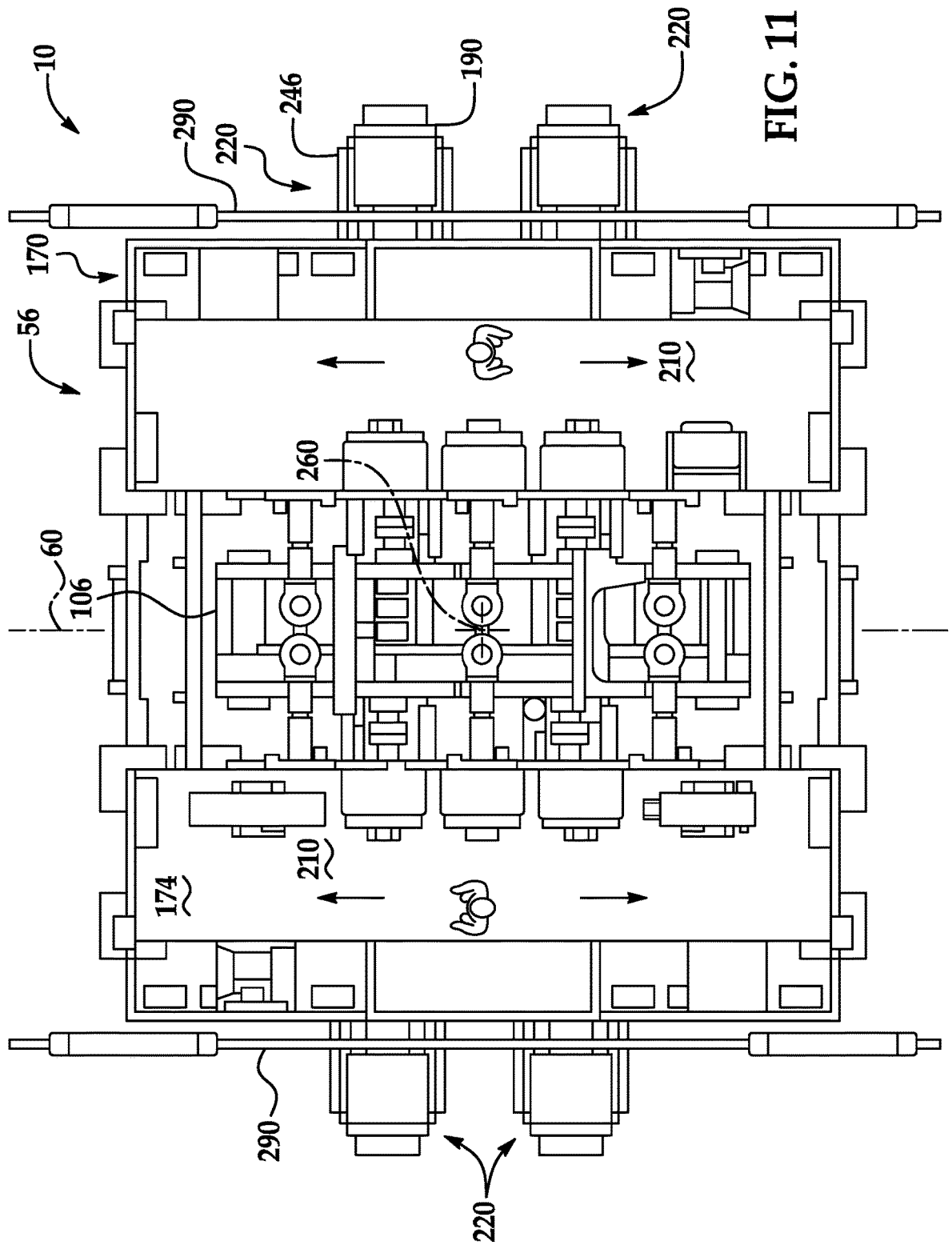
FIG. 11 is a plan view schematic of a modular assembly system station including six modular pallet devices and four modular robot platform devices.

Referring to FIGS. 10 and 11, an example of an aspect of system 10 includes modular assembly tool (AT) platforms or trays 220 to provide assembly tools or other assembly equipment, for example programmable multi-axis robots 226, additional AE devices 190 and associated accessories or devices used thereby. In one example of an AT platform 220, modular robot platforms 220 are illustrated (two shown in FIG. 10, four shown in FIG. 11) at floor level 14 of the assembly cell 56. In the exemplary AT platforms 220, a floor-positioned industrial multi-axis robot 226 having a principal axis of rotation 230 (shown in FIG. 13) is mounted to a base 236. In a preferred example, base 236 includes a base plate having precision, most preferably equally spaced, mounting points or holes 240 for mounting the robot 226. The exemplary base plate is preferably mounted to frame rails 246 that extend laterally outward from assembly path 60 as generally shown. Rails 246 preferably also include precision positioned mounting points 250, for example holes, along the length of the rails. The exemplary base plate and rail mounting points provide predetermined, highly predictable and repeatable mounting points in the Z, Y and Z dimensional coordinates for the robot relative to the rails 246.

In a preferred application, rails 246 are rigidly connected to a continuous product conveyor or other equipment positioned along the assembly line or path 60 relative to the assembly station reference point 260 as best seen in FIG. 11. Connection of the modular AT platform 220 including exemplary frame rails 246 can be made through use of rigid brackets 254 mounted in holes 252 as generally shown or other connection devices and configurations known by those skilled in the art. In a preferred example, conveyor rail holes 252 are equally spaced apart and generated with close/small dimensional tolerances for accuracy and precision mounting of the AT platforms 220. Mounting points 252 may include other structures to securely connect AT platform 220 to the conveyor or other assembly station structure for the particular application.

Although platform 220 base is shown including rails 246, it is understood that the frame or support structure can vary depending on the assembly tools and AE equipment and application. For example, support 220 may include a pallet-like structure as 170 so the AT platform 220 can be transferred and moved to the line by a forklift. The exemplary base plate may include a heavy steel plate with a grid of equally spaced holes 100 millimeters (mm) for ease of mounting the assembly tools and AE devices. The plate may be supported by rails 246 or other structures known by those skilled in the art. It is understood other platform 220 constructions to positon and mount platform 220 to the conveyor or support structure 110 can be used as known by those skilled in the art.

As discussed above for the inverted robots 150, the exemplary precision base plates 236, rails 246 and mounting holes 240, 250 and 252 provide for accurate, precise and repeatable X, Y and Z coordinate dimensional positioning of the robot 226 relative to the known assembly cell center point 260 and other assembly station equipment thereby facilitating rapid placement, plug and play and programming of the exemplary robots 226 for assembly operations once installed at the assembly plant. AT platform 220 may be connected to mounting plates that are installed in the assembly plant floor in a similar manner to those described for mounting assembly station lower frames 124 described above and below for FIG. 15.

Modular AT platforms 220 may further include the necessary control cabinets 156 to power and communicate programs and data with the respective assembly tools and AE devices 190 installed on support 220. Similar to the modular AE pallets 170 and AE devices 190 discussed above, one or more of the assembly tools, AE devices 190 and control cabinets can be pre-installed on base plates 236 and/or frames/platforms 246 at the assembly tool or other supplier's facility and be fully commissioned/tested before shipment to the system integrator or directly to the assembly plant for installation. Similarly as described for AE pallets 170, the AT platforms 220 can be pre-wired and cabled as necessary with a conduit 200 for plug and play installation and operation at the assembly facility as similarly described above. The AE devices 190 can supply consumables and other materials and functions to the assembly tools, for example robots 226, as described for AE pallets 170.

The preferably self-contained, operational and initially tested/commissioned modular AT platforms 220 and equipment thereon can be transported to the assembly line, rapidly secured and connected to the existing assembly station equipment and control system in a plug and play manner as generally described for AE pallets 170 and AE devices 190. This greatly reduces the time and effort to locate, program and calibrate the assembly tool into the assembly station for rapid, small/close dimensional tolerance production operation.

It is understood that any control cabinets and AE devices required for AT platform 220 can be mounted to the base 236 or other structure described above or can be stand alone devices that are separately and independently positioned and secured in proximity to the AT platform assembly tool. In one example where robots 226 are tasked with spot welding functions, an example of an AE device 190 can be automated weld tip dressers (not shown) precisely positioned on a larger base plate 236 or frame relative to the robot. For example, at scheduled intervals, the robots 226 can be programmed to run a maintenance cycle wherein the robots position the end effector spot weld gun weld tips in engagement with the weld tip dressers to condition the weld tips for optimum and continuous operation of the assembly cell. Other AE devices 190 discussed above, and methods of coordinating, integrating and connecting and connecting these devices with assembly tools known by those skilled in the art may be used.

Figure 13:
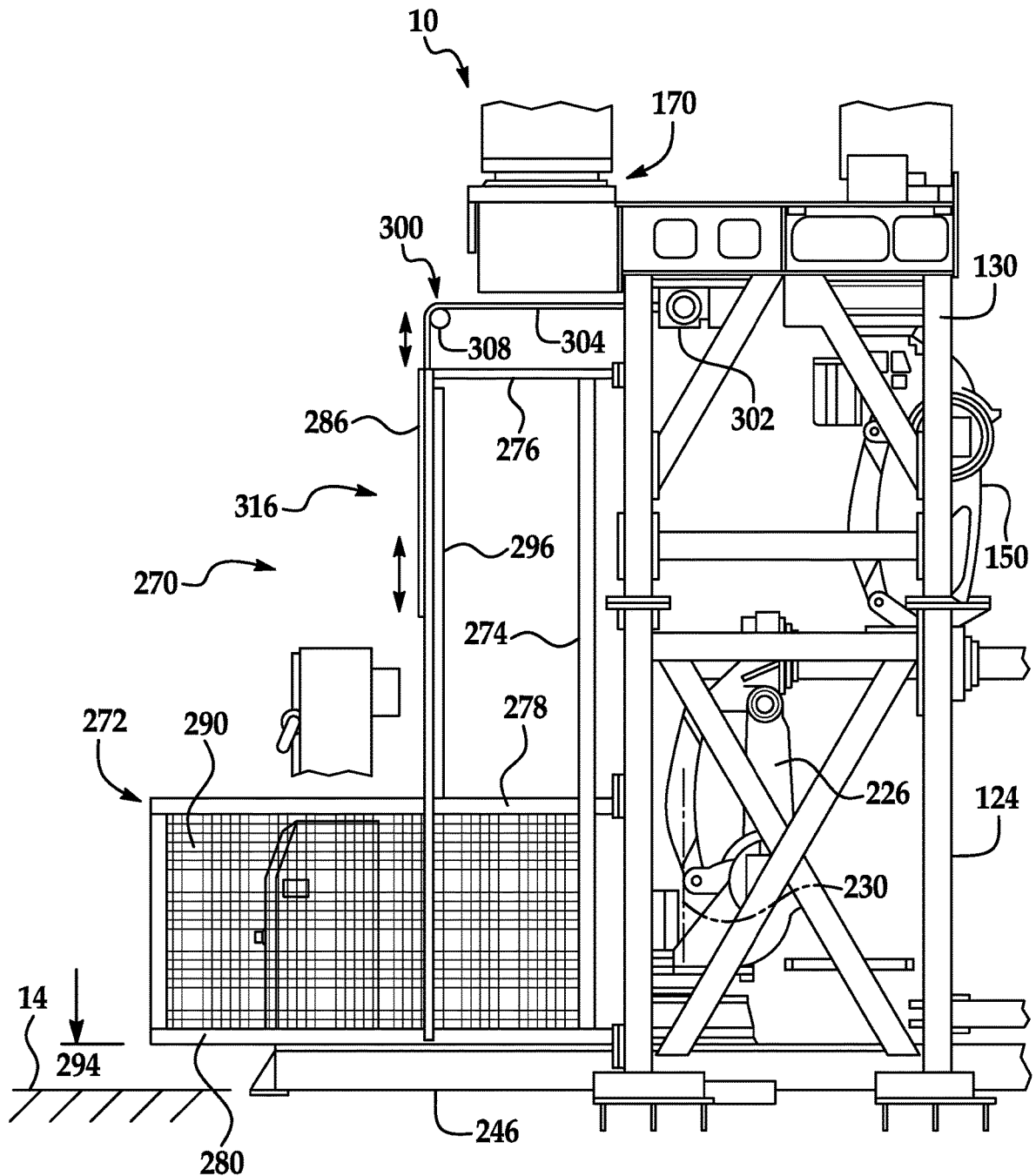
FIG. 13 is a right side view of the retractable protective fence in FIG. 12.

Referring to FIGS. 12 and 13, another aspect of an example of system 10 includes a modular protective fence or guard 270 which assists in preventing personnel from entering assembly station 56 during operation. In the example, fence 270 includes a first frame 272 and a second frame 273 as generally shown. In a preferred example, each frame 273 and 273 includes a vertical post 274, an upper support 276, an upper rail 278 and a lower rail 280. In the example fence 270, one or more front panels 286 extending along parallel to assembly path 60 and side panels connected between the upper 278 and lower 280 rails are used. In a preferred example, each fence frame is rigidly mounted to and cantilevered from the assembly station lower 124 and upper 130 frames as generally shown. This advantageously places the lower rail 280 and side panels 290 a predetermined height 294 above the plant floor 14 negating traditional mounting structures to the plant floor 14. This is advantageous for faster installation, maintenance and repair and cleaning of the assembly plant floor. This is further advantageous over conventional protective guards further providing for a modular plug and play assembly system with minimal requirements or reliance on the existing assembly plant infrastructure.

Front 286 and side 290 side panels can be made from steel, aluminum or other materials, for example transparent materials like polycarbonate, forming a grating or barrier to keep personnel and objects from unauthorized entry into the assembly station. Other materials, sizes, shapes and configurations of the panels and frames known by those skilled in the art may be used.

In a preferred application of modular fence 270, the front panel 286 is slidingly mounted in guides 296 and connected to a retractor device 300. An example of a retractor device 300 includes an electric motor 302 mounted to upper frame 130, a cable 304 and a stationary pulley 308 as generally shown. The retractor is selectively operable by an operator or control system (not shown) to raise the front panel from a first lower position 310 proximate floor 14 to a raised upper position 316. Upper position 316 is preferably of sufficient height such that operators and other equipment, for example forklifts, can enter assembly cell 56 and access and move assembly tools and other equipment to and from assembly cell 56 as necessary in the normal operation of the facility.

As best seen in FIG. 12, in an application of fence 270 with use of AT platforms 220, the guides 296 are preferably positioned laterally outward from the assembly tool robots 226 and laterally inward from control cabinets 156 and AE devices 190 as generally shown. This provides access to the assembly tool controls and AE devices 190 to, for example replenish consumable materials provided to the assembly tools by the AE devices 190. Other positions of fence front and side panels known by those skilled in the art are within the present invention.

In a preferred application and operation of fence 270, the front panel 286 is normally positioned in the lower position 310 when the assembly station 56 is energized or in active assembly operations. When maintenance or access to equipment inside of assembly cell 56 is required, retractor device 300 can be engaged manually or through signals received from a local or central controller (not shown), to raise front panel 286 to the upper position 316 allowing personnel and equipment easy access into the cell 56 without the need for disassembly or partial removal/relocation of traditional protective fences or guards. It is understood that different configurations of fence 280 can be made to suit the particular assembly cell or line and known by those skilled in the art. Further, retractor 300 can take other forms and features known by those skilled in the art. For example, front panels can be manually raised and locked into place with pins or other devices and then manually lowered to continue assembly operations.

Figure 14:
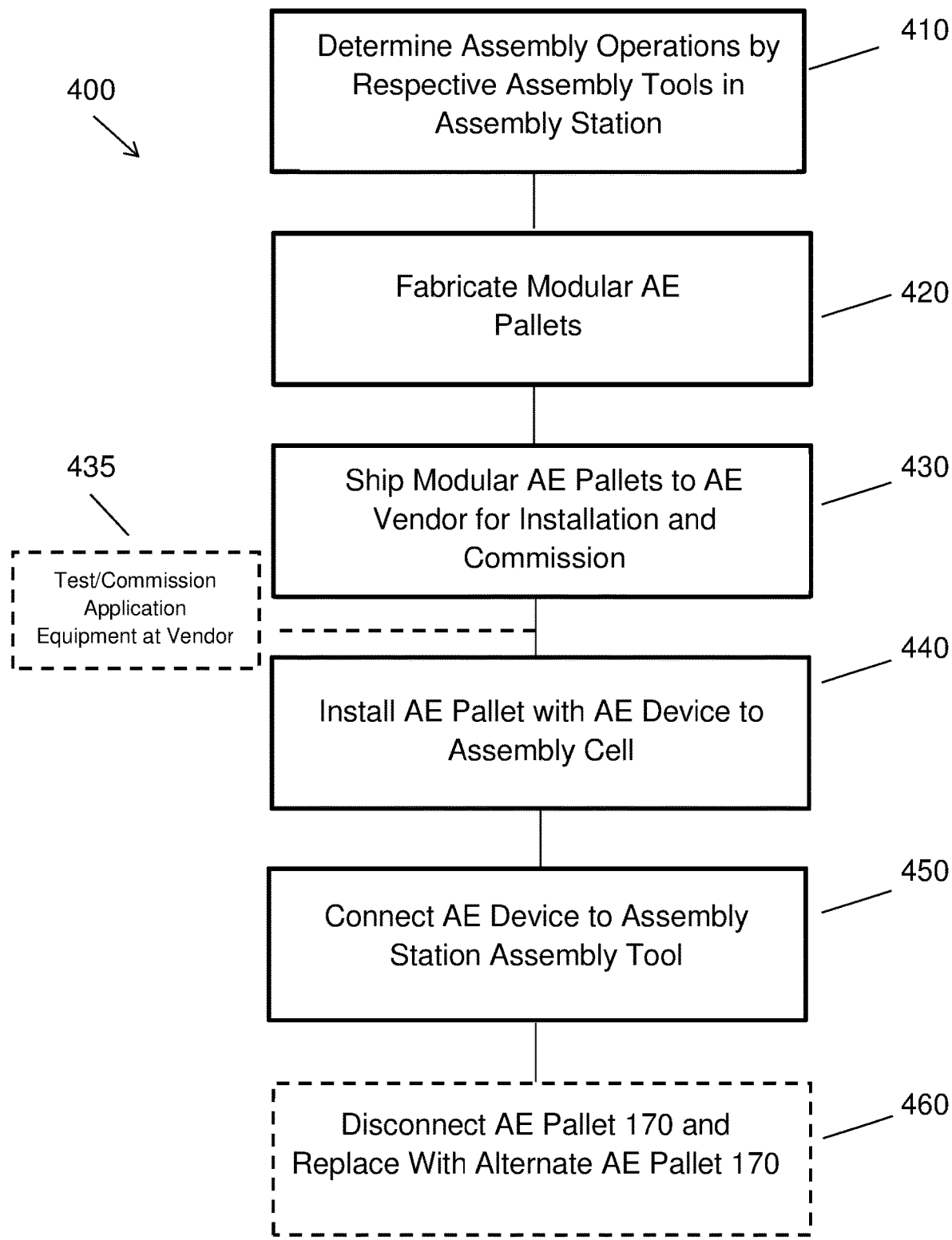
FIG. 14 is a flow chart of an example of a method for assembling and installing modular application equipment pallets and associated application equipment.

Referring to FIG. 14 a flow chart of an exemplary process 400 to build and install AE pallets 170 in an exemplary robot assembly tool application is shown. In the exemplary process, at step 410 it is determined the number and specific assembly operations that will be performed in one or more assembly stations 56, for example exemplary vehicle body assembly operations executed by industrial robots 150 with various end effectors for a variety of assembly operations. A plurality of modular, and preferably identical, AE pallets 170 are fabricated having the structural and spatial features described in the examples above in step 420. In step 430, the modular AE pallets 170 are shipped "empty" in large quantities to a respective vendor for installation of an AE device (or devices) 190 by the vendor for a particular robot 150 or other assembly tools.

In an optional step 435, the installed AE device 190 on the modular pallet 170 is pre-wired/pre-cabled with conduit 200 including power and data communication lines 206 appropriate for the assembly station, assembly tool and/or assembly operation and mated with coordinating connectors for attachment with connectors on the control cabinets, the robots 150, other assembly tools or other assembly cell equipment. The AE device 190 is then preferably tested/ commission at the vendor or system integration to ensure proper operation before shipment to the assembly plant. In some AE devices 190, advanced testing and pre-programming of software can be performed at the vendor with minimal or no modifications and adjustments being necessary at the assembly plant for volume production.

In exemplary step 440, the modular AE pallet 170 and installed AE device 190 is shipped to an intermediary system integrator facility, or alternately directly to the assembly plant, and matched with the prefabricated assembly scaffold frame 120, conveyors, non-model specific equipment, for example pre-installed robots 150, and selected model-specific equipment assigned the assembly task supported by the application equipment 190. The pallet 170 may be elevated into position proximate upper frame 130 and floor 136 by a forklift or other lifting mechanism. The modular pallet 170 is then engaged to the upper frame 130 in the examples described, for example engagement of hooks 188 with coordinating slots 144 in upper frame 130.

In exemplary step 450, the application equipment conduit 200 is routed and the prewired or pre-cabled lines 202, 204, 205 and/or 206 are connected to the pre-wired or pre-cabled robot 150, control cabinets or other cell equipment for rapid install, communication and operation of the assembly cell 56. In an optional step (not illustrated), consumables 216 are transferred to and placed on upper frame(s) 130 through distribution decks 212 to supply the respective AE devices 190 with needed materials to support the predetermined assembly operations.

In an optional step 460, on a failure or required heavy maintenance of the AE device 190 installed on the modular AE pallet 170, the entire pallet 170 is preferably disconnected from the control cabinet, robots and upper frame 130 and quickly replaced with another pallet 170 with replacement or alternate AE device(s) 190. This equally applies where a product model changeover occurs and/or robot tasks changed. The existing AE pallets 170 with AE device 190 is disconnected and swapped out with an alternate pallet 170 having the appropriate AE device 190 for the new assembly task.

As described, the process 400 may equally be applied to AT platforms 220, or the AE devices 190 used therewith as described. For example, if a robot assembly tool fails or needs heavy maintenance, the modular AT platform 220 can be disconnected and replaced with a new or alternate assembly tool and AE devices 190 as required, and connected to the conveyor or other equipment as described above. The mounting points of the base 236, rails 246 and conveyor provide for rapid reconnection of a replacement AT platform 220 relative to the assembly station and/or assembly station reference point 260 thereby minimizing reprogramming or calibration of the new assembly tool.

Figure 15:
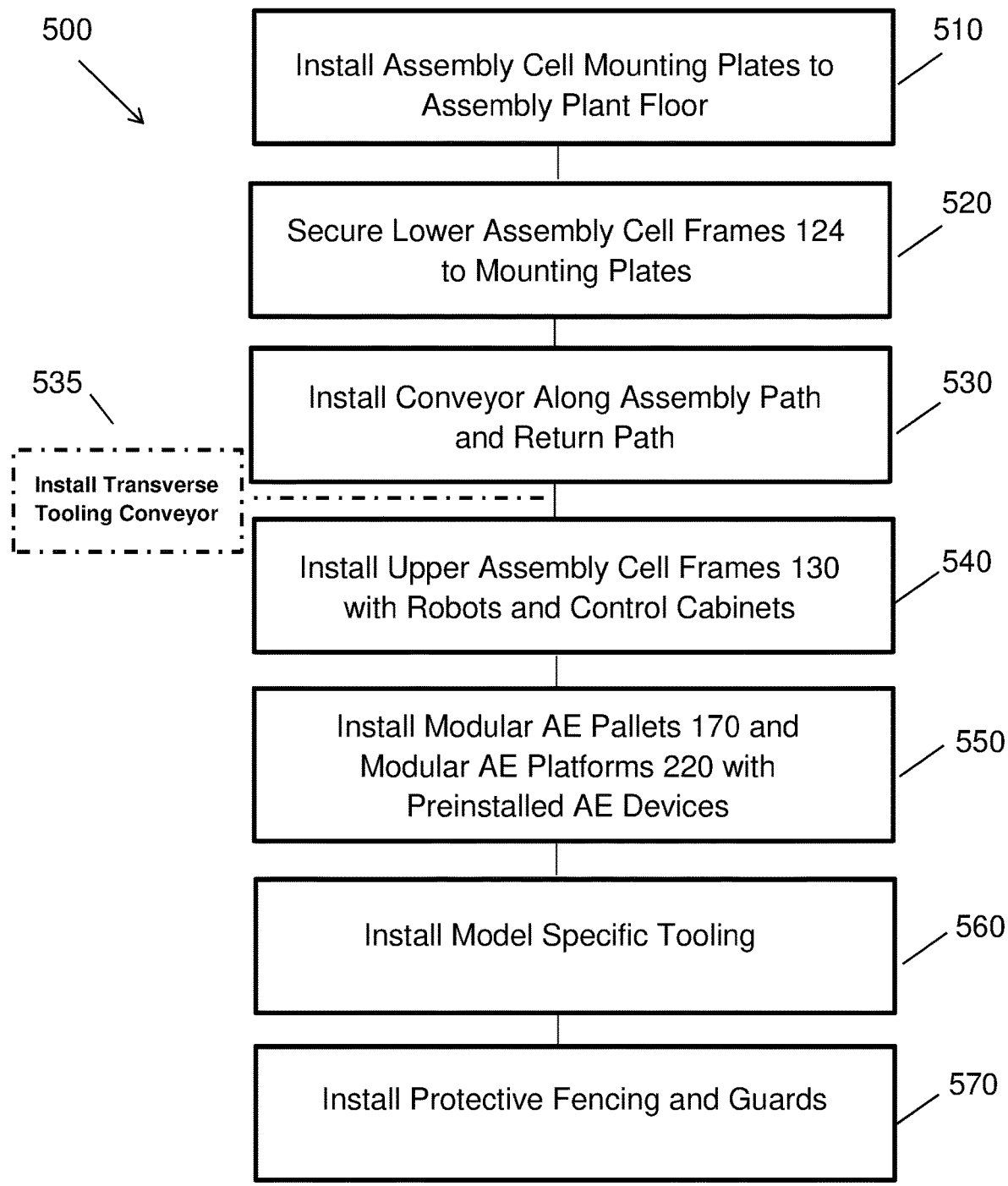
FIG. 15 is a flow chart of an example of a method for assembling or installing a modular vehicle assembly system of the present invention.

Referring to FIG. 15 an exemplary method 500 of assembling or installing a modular vehicle assembly system 10 is illustrated. In the example, prefabrication of system 10 infrastructure such as frames 120, conveyors or transports 48, assembly tools for example robots 150/226 and other unique tooling is assumed to be already complete, but understood can vary as known by those skilled in the art.

In an initial step not shown, the centerline of assembly line 60 is preferably determined. In one example, the centerline is determined from existing X, Y and Z dimensional coordinate reference points defined by the assembly plant. An assembly cell reference point 260 may be determined as described above.

In the example, in step 510 lower frame 124 mounting plates are secured to the assembly plant floor 14 in predetermined locations relative to the assembly line 60, assembly center line and/or assembly cell centerpoint 260 as generally described and illustrated. In step 520, the lower frames 124 are removably secured to the mounting plates on both sides of the assembly line path 60. The attachment points where the lower frames attach to the floor mounting plates are preferably laterally spaced from the assembly line centerline and longitudinally positioned along the assembly line at predetermined locations. In an alternate method (not shown), the lower frames 124 are mounted to the floor at predetermined locations which then the below conveyor is positioned and mounted with respect thereto. The assembly cell reference point 260 may then be established based on the installed frame and conveyor.

In step 530 the vehicle conveyor system along assembly path 60 is installed as well as any framing needed where a return conveyor along a return upper path 84 is installed. In an optional step 535 where an overhead conveyor is used as generally shown in FIG. 3B, a transverse tooling conveyor 112 may be installed. In a preferred example, the lower frames 124, and conveyors 50/52/90/110 defining respective assembly paths 60/78 and 84, tooling conveyor 112 (if an overhead conveyor system) and protective fences 280 are considered to be vehicle non-model specific equipment. In other words, these devices are preferably wholly standard and used for all vehicle models or other products to be assembled.

In exemplary step 540, the assembly station upper frame 130 is installed and secured atop the lower frame 124. In one example, the assembly tool industrial robots 150 and control cabinets 160 are pre-installed on the upper frame 130 as a unit by a vendor prior to delivery to the assembly cell and prior to securing it to lower frame 124. In a preferred example, the upper frames 130, although may all be modular, identical and standard in construction, are shipped "empty" to a vendor for installation of model-specific equipment, for example preprogrammed assembly tool robots 150 and appropriate control cabinets 160. The vendor, similar to that described for AE pallets 170 and AE devices 190, installs and commissions the assembly tools and/or model specific equipment on upper frame 130 (or as much as practically possible depending on the equipment and application) at the vendor or system integrator's facility prior to shipment to the assembly facility for installation into the assembly station 56 and final commission for production assembly. Alternately, the robots 150 and control cabinets 160 may be installed following installation of the upper frame 130 onto the lower frame 124 in the assembly facility or in another sequence as known by those skilled in the art.

In exemplary step 550 the AE pallets 170 with preinstalled and commissioned vehicle/product model specific AE devices 190 are transported to the assembly facility and secured to upper frames 130, coordinated with the appropriate control cabinet, and electronically connected to the robot 150, end effector or other assembly cell tools and equipment as generally described above. The same or similar process would be carried out for any model specific modular AT platforms 220 for a pallet-style conveyor system (FIG. 2) as generally described above.

In exemplary step 560, unique vehicle or product model specific tooling trays, tooling, fixtures and other equipment are delivered and installed to complete the operational assembly station equipment.

In exemplary step 570, any remaining protective fences 270 to accommodate the model specific equipment are installed and/or enabled. It is understood that depending on the assembly cell, part or all of the protective fence or fences 270 may be installed earlier as described or where appropriate in the cell assembly process.

Figure 16:
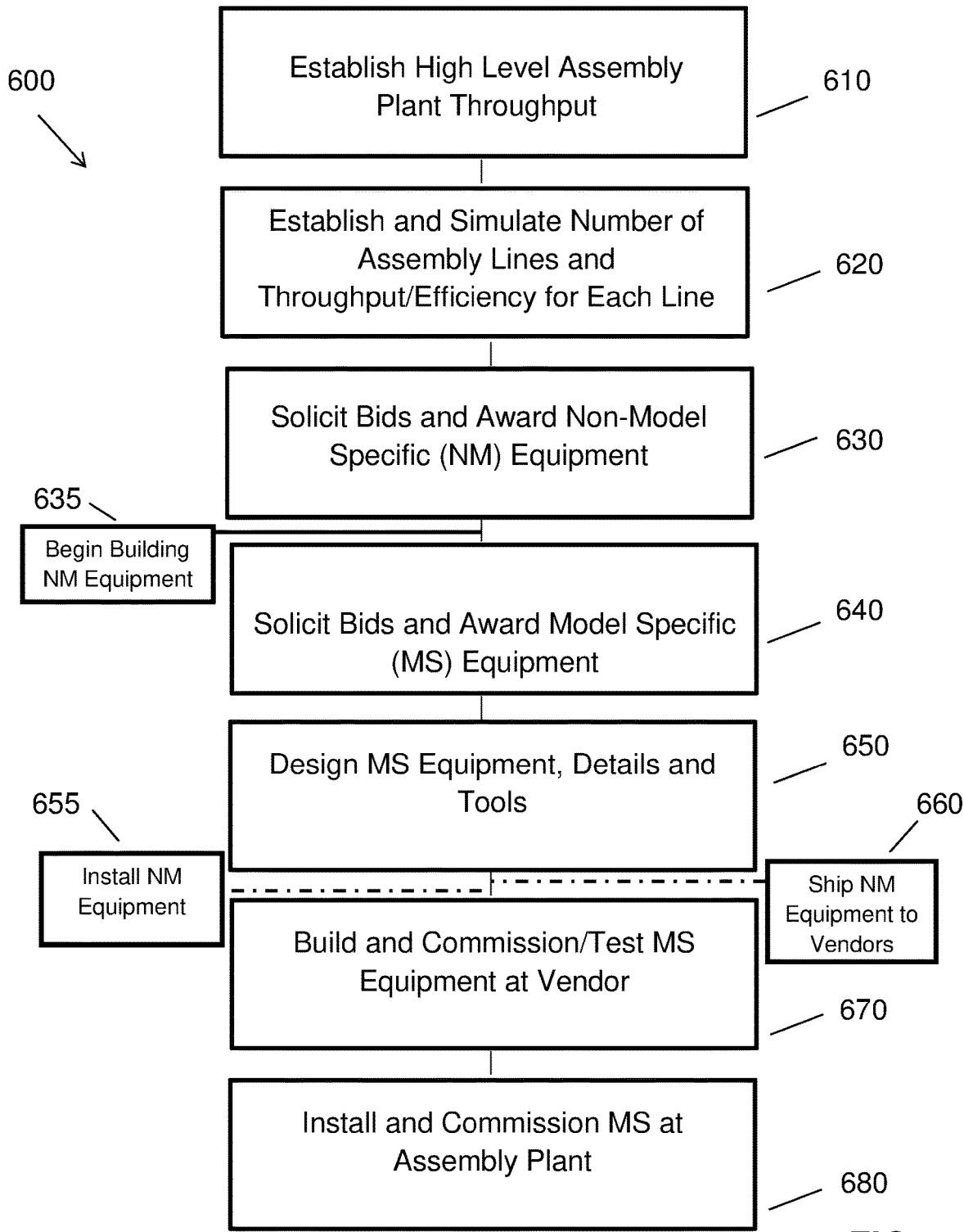
FIG. 16 is a flow chart of an example of a method for purchasing or sourcing vehicle assembly lines using non-model specific and model-specific equipment.

Referring to FIG. 16 another exemplary aspect of the invention is illustrated. In FIG. 16 an exemplary process, business method or solution 600 for purchasing/sourcing, fabricating and installing equipment for a vehicle body or other product assembly line is illustrated. The exemplary process is particularly useful with the modular system 10 described above, but may be used with other assembly operations for other products. It is understood the method 600 can be used for products other than vehicle body assembly as known by those skilled in the art.

In the example, step 610 establishes high level assembly plant parameters including plant size and target vehicle (or other product) throughput (vehicles/products per hour, shift, week and/or month or other periods or variables).

In step 620, the assembly plant is preferably simulated three-dimensionally through CAD-CAM or other simulation tools to establish the number of assembly lines and throughput and/or efficiency of each individual assembly line. It is understood this step could be done manually or through other conventional processes and mechanisms known by those skilled in the art.

In step 620, the assembly operations and equipment necessary for completing the assembly tasks are determined for each assembly line 40-45. For each assembly line, the equipment is initially determined to be vehicle/product non-model specific or vehicle/product model specific. In the example, equipment is vehicle non-model specific if the equipment is useful in assembly regardless of which vehicle model or body style is being assembled. An example of vehicle non-model specific and model specific for the described system 10 is:

Vehicle Body Non-Model (NM) Specific:
    Conveyor (overhead-style 90 or pallet-style 106);
    Both along assembly path 60 and any return path 84;
    Base conveyor pallets 106 or suspended carriages;
    Component and subassembly delivery devices (in system 10 provided by carts 62 or carriage racks 94);
    Generic/standard component trays, for example steel panels with precision cut holes in a 100 millimeter (mm) grid pattern for precision positioning and securing model specific detail fixtures or holders for individual components or subassemblies to be assembled;
    Lifting mechanisms within assembly cell for use with pallets or suspended carriages;
    Buffer conveyor zones along and/or laterally between assembly lines;
    Lower 124 and upper 130 assembly cell frames (without robots 150 or control cabinets);
    Frame 54 for return conveyor along path 84;
    Carriage/pallet elevator device to move from lower path 60 to upper path 84;

Transverse tooling conveyor 112;

Robots 150/226 that are not preprogrammed for particular assembly operations;

Modular AE pallets 170 (without application equipment 190);

Distribution decks 212;

Modular AT platforms 220 (without robots or control cabinets or accessories); and Partial or all protective fencing 270.

Vehicle Body Model Specific (MS):

Unique tooling and fixtures for conveyor suspended carriages and pallets;

Unique tooling and fixtures for to-be-assembled component panels/trays

Unique tooling and fixtures for transverse tooling conveyor 112;

Robots 150/226, robot controls and control cabinets 160 and preprogrammed and stored software for particular assembly tasks/operations;

Robot end effectors 156;

Any portion of conduit 200 including pre-plumbing, wiring, cables, pipes and connectors of robots/assembly tools to accept and connect to AE devices 190 and consumable materials;

AE devices 190; and

Any portion of conduit 200 including pre-plumbing/wiring, cables, pipes and connectors on AE pallet 170 and AT platforms 220.

It is understood that variations whether equipment is initially designated as non-model specific or model specific may occur depending on the product, assembly application and operations within an assembly cell.

In step 630, in a preferred example, the non-model specific equipment is placed out for competitive bid contract and awarded to a single or minimum number of vendors. In the example for system 10, all vehicle non-model specific assembly equipment for all assembly lines may be sourced to one vendor. This is possible in part as the non-model specific equipment is standard and/or modular and at least partially pre-designed. This reduces and minimizes prior processes which took months and months to largely, if not wholly, custom design the non-model specific infrastructure and equipment for every assembly plant. In system 10, since the non-model specific equipment is preferably modular and predesigned, the process to bid and award happens far more quickly than the conventional process.

At this optional point in time for step 635, fabrication can begin on the system 10 modular non-model specific infrastructure and equipment.

In step 640, based on the predetermined and preferably already designed modular, non-model specific equipment, the vehicle model specific assembly equipment is specified and competitively placed out for supply bid contract. In a significant advantage over conventional processes, the bids for the model specific equipment can go out much faster, possibly many months faster, as the non-model specific designs, or a great many portions thereof, are already complete. In one example in step 640, supply contracts for the model specific equipment for each assembly line 40-45, or combinations of assembly lines, may be awarded to other integrators/vendors. During this period 640, the non-model specific equipment is already partially or wholly awarded and preferably fabrication already underway.

In a preferred example of step 640, each winning model specific vendor would be responsible for the required product throughput performance for the awarded lines. It is understood that steps 635 and 640 can occur simultaneously or even switched depending on how long the lead times are for effective management of the quotation process.

In exemplary step 650, the awarded model specific equipment is designed. During this period, fabrication of the awarded non-model specific in step 635 continues. Where appropriate, in step 655 installation of the completed non-model specific equipment can occur at the assembly facility for initial commission. Where non-model specific equipment is to be delivered to the model-specific vendor, for example empty upper frames 130, AE pallets 170 and AE platforms 220, these can be shipped to the model specific vendors in step 660.

In exemplary step 670, the model specific equipment is fabricated and commissioned/tested. In a preferred example respecting upper frames 130, AE pallets 170, AE supports 220 and necessary AE devices 190 are installed, wired and plumbed with the appropriate cables and harnesses and tested at the vendor's facility as generally described above.

In exemplary step 680 the tested vehicle model specific equipment arrives and is installed at a system integrator or directly at the assembly plant. In the example of the AE pallets 170 with installed AE devices 190, the AE pallets are lifted into positon and quickly secured to upper frame 130 as previously described. The conduit 200, which may include one or more of 202, 204, 205 and 206 are quickly and readily connected to the control cabinets, robot 150 (or other assembly tools or equipment) and coordinated with the equipment in the assembly station for rapid and already proven operability avoiding may problems and delays in conventional systems. This similarly occurs for modular AT platforms 220 as previously described. Other model-specific equipment is fabricated, tested and installed in the same manner. If the particular assembly plant or equipment warrants it, the fabricated modular upper frame 130 may have been shipped to the model-specific vendor. In such an instance, the robots 150, AE pallets 170, AE devices 190, and control cabinets 160 may arrive to the assembly plant and be installed as a completed unit atop the lower frames 124. Alternately, the separate AE pallets 170 shipped to the assembly facility, but can be installed after the upper frame and robots are installed on the lower frames 124.

In one optional step (not shown), on initial installation or once production assembly begins, for example if a particular first AE device 190 fails or needs maintenance or refurbishment, the entire first AE pallet 170 or platform 220 that the respective failed first AE device 190 or assembly tool is secured to can be quickly disconnected and removed from upper frame 130 or conveyor and replaced. In one example, new (or refurbished) and tested replacement first AE device or alternate second AE device 190 preinstalled on an alternate or second AE pallet 170 can be raised, secured to upper frame 130 and connected to the control cabinet, robot and assembly cell in a matter described above.

Once operational, in an optional step not shown the individual assembly lines 40-45 throughput requirements are monitored and enforced on an assembly line-by-line basis, and the respective equipment vendor which supplied the particular model specific line and/or equipment is held accountable to meet the predetermined performance targets, to ensure the overall assembly line and assembly plant vehicle/product throughput specification is achieved.

For all of the described and illustrated methods 400, 500 and 600, it is understood that additional steps, fewer steps and reordering of the above steps consistent with this technical disclosure can be made to suit the particular application and performance specifications as known by those skilled in the art without deviating from the present invention.

Although described individually, the modular AE pallets 170, AT platforms 220 and fence 270 may all be included, or separately included in various combinations to suit the particular application, to form the system 10 structure and methods as described and/or illustrated herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method for manufacturing modular application equipment for use in supporting high volume quantity operations in a product plant, the method comprising:
   receiving at a separate vendor facility remotely located from a product plant a plurality of modular application equipment (AE) pallets, each AE pallet having a mounting surface;
   selecting a first of a plurality of application equipment (AE) devices suitable for a first operation of a predetermined tool positioned in the product plant, the first AE device operable to assist the predetermined tool in a predetermined tool operation;
   connecting the selected first AE device to one of the plurality of AE pallets; and
   verifying at the separate vendor facility a proper operation of the first AE device connected to the AE pallet for use with the predetermined tool prior to transfer of the first AE device connected to the AE pallet to the product plant.

2. The method of claim 1 further comprising the step of connecting a conduit to the first AE device prior to transferring the AE pallet to the product plant.

3. The method of claim 2 wherein the step of connecting a conduit to the first AE device further comprises pre-wiring the AE pallet with suitable cables having connectors operable to coordinate with mating connectors for the predetermined assembly tool.

4. The method of claim 1 wherein the AE pallet includes a mounting surface, wherein the step of connecting the selected first AE device to the first AE pallet comprises removably connecting the first AE device to the AE pallet mounting surface.

5. The method of claim 4 further comprising providing the AE pallet mounting surface with an array of equally spaced mounting holes positioned 100 millimeters (mm) apart from one another.

6. The method of claim 4 further comprising providing the AE pallet with a safety railing connected to mounting surface.

7. The method of claim 1 wherein the step of verifying proper operation at the vendor further comprises preprogramming the first AE device with software operable to coordinate with the predetermined assembly tool once the AE pallet is connected to the predetermined assembly tool at the product plant.

8. The method of claim 1 wherein the step of selecting a first of a plurality of AE devices comprises selecting one of a fluid dispensing device, a fastener dispensing device, a welding wire dispensing device, a welding electrode dispensing device, or a welding controller.

9. The method of claim 1 wherein the predetermined tool further includes a second operation different than the first operation, the method further comprising:
   selecting a second of the plurality of AE devices, the second AE device different than the first AE device and suitable for the predetermined tool second operation;
   connecting the selected second AE device to one of the plurality of AE pallets; and
   verifying at the vendor a proper operation of the second AE device connected to the AE pallet for use with the predetermined tool second operation prior to transfer of the second AE device connected to the AE pallet to the product plant.

10. A method for providing application equipment for use in supporting assembly or manufacturing operations in a station in a high volume quantity product assembly or manufacturing plant, the method comprising:
    fabricating a plurality of modular application equipment (AE) pallets, each modular pallet having a mounting surface;
    selecting a first of a plurality of application equipment (AE) devices suitable for a predetermined assembly tool having a first predetermined operation positioned in an assembly station in a remote assembly or manufacturing plant, the assembly station having a frame portion operable to connectingly receive at least one AE pallet;
    connecting the selected first AE device to a first of the plurality of AE pallets;
    transferring the first AE pallet with connected first AE device to the assembly station in the remote assembly or manufacturing plant;
    connecting the first AE pallet to the frame proximate to the predetermined assembly tool;
    connecting a conduit to the first AE device and the predetermined assembly tool; and
    selectively providing a consumable material by the first AE device to the assembly tool through the conduit to assist assembly or manufacturing operations conducted by the assembly tool in the assembly station.

11. The method of claim 10 further comprising the step of verifying proper operation of the first AE device connected to the first AE pallet at a vendor remote from the assembly or manufacturing plant prior to transferring the first AE pallet with the connected first AE device to the remote assembly or manufacturing plant.

12. The method of claim 11 wherein the step of verifying proper operation of the first AE device at the vendor further comprises verifying proper operation for use with the predetermined assembly tool.

13. The method of claim 10 wherein connecting the conduit to the AE device and the predetermined assembly tool further comprises connecting the conduit to the AE device at the remote vendor prior to transferring the AE pallet and connected AE device to the remote assembly or manufacturing plant.

14. The method of claim 13 wherein connecting the conduit to the AE device further comprises pre-wiring the AE pallet with suitable cables having connectors operable to coordinate with mating connectors for the predetermined assembly tool.

15. The method of claim 10 wherein connecting the conduit to the AE device and the predetermined assembly tool further comprises connecting the conduit to the AE device and a control cabinet for the predetermined assembly tool.

16. The method of claim 10 wherein on a need to replace the first AE device, the method further comprising the steps of:
disconnecting the conduit from the assembly tool;
disconnecting the first AE pallet from the frame;
replacing the first AE pallet through connecting to the frame in place of the disconnected first AE pallet a replacement first AE pallet selected from the plurality of AE pallets, the replacement first AE pallet having a replacement first AE device connected to the replacement first AE pallet; and
connecting the conduit to the replacement first AE device and the assembly tool.

17. The method of claim 10 wherein the predetermined assembly tool includes a predetermined second operation different than the first operation requiring a second AE device different than the first AE device, the method further comprising the steps of:
changing the operation of the predetermined assembly tool from the first operation to the second operation;
disconnecting the conduit from one of the predetermined assembly tool or the first AE device;
disconnecting the first AE pallet having the first AE device from the frame;
replacing the first AE pallet through connecting to the frame in place of the disconnected first AE pallet a second of the plurality of AE pallets to the frame, the second AE pallet having a second AE device connected to the second AE pallet operable to assist the predetermined assembly tool predetermined second operation;
connecting the conduit to one of the second AE device or the predetermined assembly tool.

18. A method for manufacturing modular application equipment for use in supporting high volume quantity operations in a product plant, the method comprising:
receiving at a vendor remotely located from a product plant a plurality of modular application equipment (AE) pallets, each AE pallet having a mounting surface;
providing each AE pallet with an AE pallet connector operable to removably engage with a frame positioned in the product plant;
selecting a first of a plurality of application equipment (AE) devices suitable for a first operation of a predetermined tool positioned in the product plant, the first AE device operable to assist the predetermined tool in a predetermined tool operation;
connecting the selected first AE device to one of the plurality of AE pallets; and
verifying at the vendor a proper operation of the first AE device connected to the AE pallet for use with the predetermined tool prior to transfer of the first AE device connected to the AE pallet to the product plant.

* * * * *